(12) United States Patent
Harada

(10) Patent No.: US 6,646,804 B2
(45) Date of Patent: Nov. 11, 2003

(54) ZOOM LENS SYSTEM AND OPTICAL APPARATUS USING THE SAME

(75) Inventor: Akira Harada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/995,223

(22) Filed: Nov. 27, 2001

(65) Prior Publication Data

US 2002/0101661 A1 Aug. 1, 2002

(30) Foreign Application Priority Data

Nov. 28, 2000 (JP) ......................... 2000/361115

(51) Int. Cl.$^7$ ........................... G02B 27/64; G02B 15/14
(52) U.S. Cl. ..................... 359/557; 359/554; 359/676; 359/689
(58) Field of Search ................. 359/554–557, 359/687–692, 683; 396/52–55; 348/208

(56) References Cited

U.S. PATENT DOCUMENTS

| 4,978,205 A | * | 12/1990 | Sato ........................... 359/554 |
| 5,559,635 A | * | 9/1996 | Sato ........................... 359/689 |
| 5,606,456 A | * | 2/1997 | Nagata et al. ............... 359/554 |
| 5,654,826 A | | 8/1997 | Suzuki ........................ 359/557 |
| 5,698,841 A | * | 12/1997 | Momoki ................... 250/201.2 |
| 5,731,897 A | * | 3/1998 | Suzuki ........................ 359/557 |
| 5,760,957 A | * | 6/1998 | Suzuki ........................ 359/557 |
| 5,825,546 A | * | 10/1998 | Matsui ....................... 359/557 |
| 5,828,490 A | | 10/1998 | Sato ........................... 359/557 |
| 6,115,188 A | * | 9/2000 | Nishio et al. ................ 359/690 |

FOREIGN PATENT DOCUMENTS

| JP | 8-278445 | 10/1996 |
| JP | 9-325269 | 12/1997 |

* cited by examiner

Primary Examiner—Thong Nguyen
(74) Attorney, Agent, or Firm—Morgan & Finnegan, L.L.P.

(57) ABSTRACT

There are provided a zoom lens system including, in order from an object side, a front lens component including a plurality of lens unit for zooming and focusing, and a rear lens component for forming an image, the rear lens is a zoom lens including, in order from the object side, a lens unit A of positive refractive power, a lens unit B of negative refractive power movable so as to have a component in a direction perpendicular to an optical axis for displacing the image, and a lens unit C of positive refractive power.

11 Claims, 21 Drawing Sheets

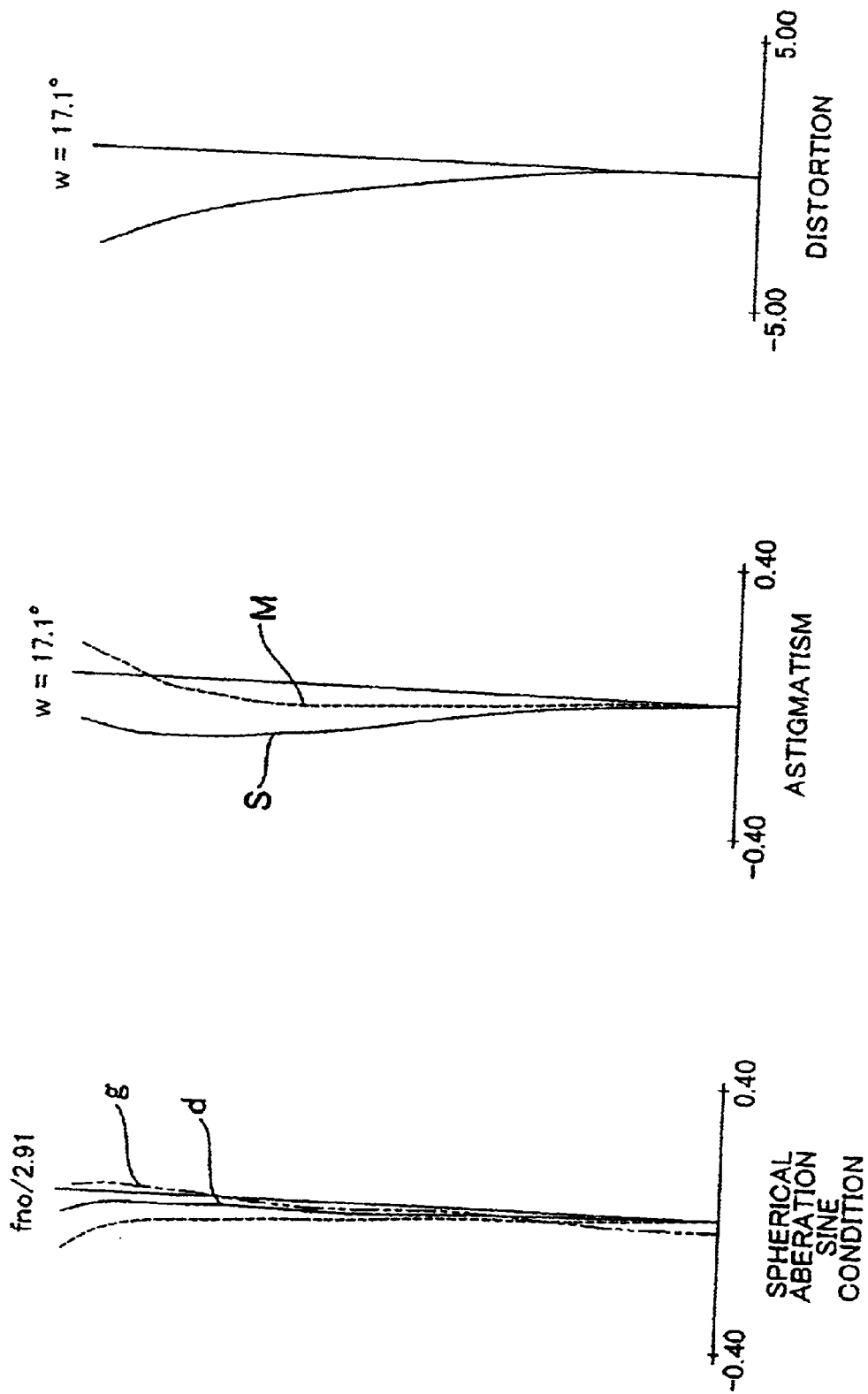
F I G. 9

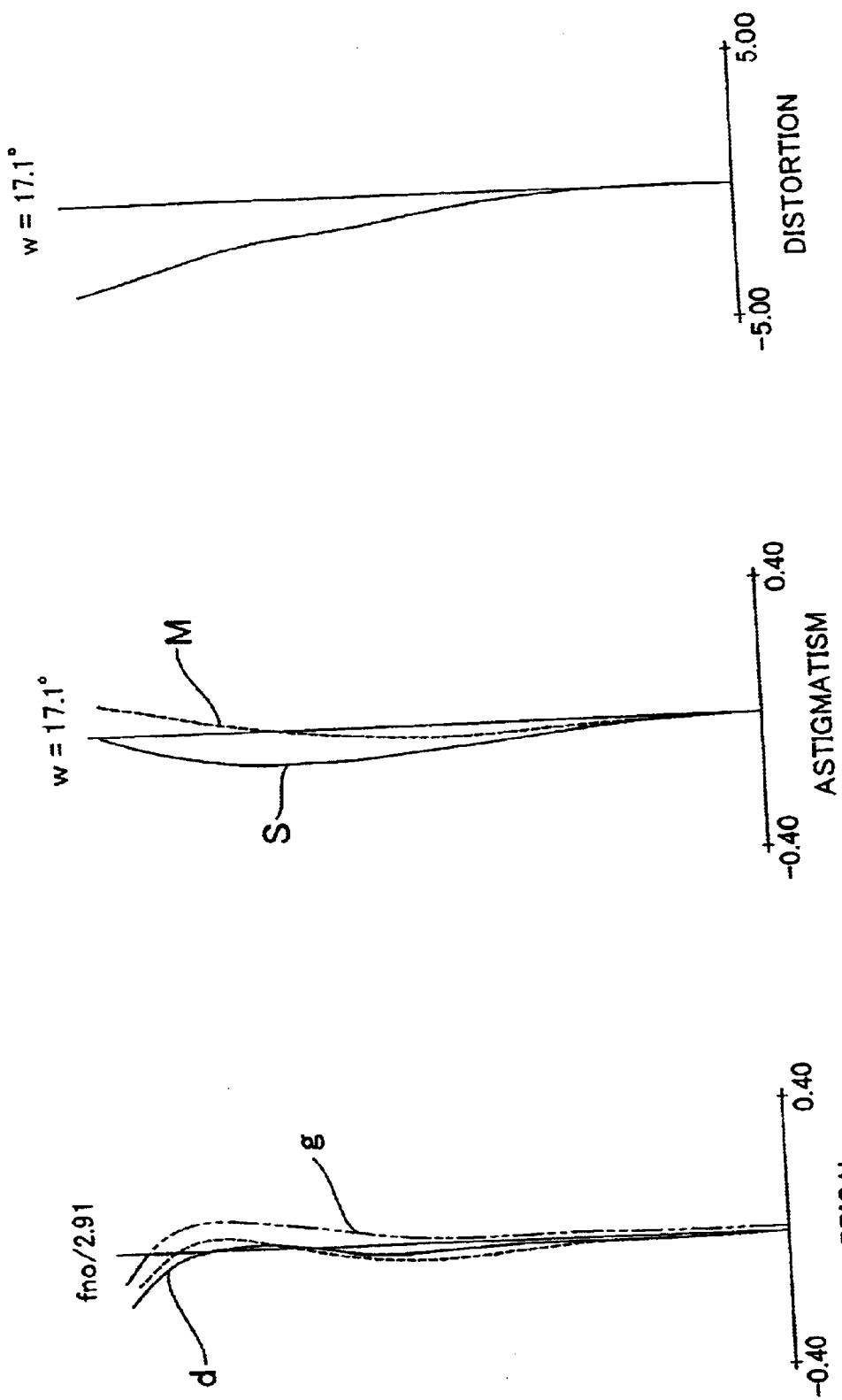

ZOOM LENS SYSTEM AND OPTICAL APPARATUS USING THE SAME

BACKGROUND OF THE INVENTION

The present invention relates to a zoom lens system and optical apparatus using the same, and more particularly those suitable for video cameras, digital cameras, and cameras using a silver halide film which attempt to stabilize a shot image and to optically correct blurs in the shot image when a zoom lens vibrates and tilts.

An image pick-up system having a long focal length, such as a telephoto lens, is generally so bulky and heavy that it is difficult to stabilize an image for such an image pick-up system. As the image pick-up system vibrates and tilts, a shot image displaces (or blurs) according to the tilt angle and the focal length of the image pick-up system. Thus, various image stabilizing optical systems have conventionally been proposed so as to prevent blurs in short images.

Generally speaking, a diameter and weight in an image stabilizing lens unit are important factors to obtain good image stabilization for large-aperture, telescope type zoom lenses. A large-aperture image stabilizing lens unit would require a large-caliber actuator for driving it, and lens's heavy weight would result in increased power consumption.

For example, an image stabilizing zoom lens proposed in Japanese Laid-Open Patent Application No. 8-278445 would possibly increase a diameter of image stabilizing lens unit. An image stabilizing zoom lens proposed in Japanese Laid-Open Patent Application No. 9-325269 uses two lenses to reduce image stabilizing lens unit's weight, and would possibly lead to aberrational fluctuations in stabilizing an image.

A mechanism for vibrating part of lens unit in an image pick-up system and for eliminating blurs in a static shot image generally requires a larger image-blur correction amount, smaller mobile and rotary amounts of a (movable) lens unit to be vibrated for blur corrections, a smaller size for the whole apparatus, and the like.

In addition, where the defocus of the movable lens unit causes much decentering aberration, the decentering aberration defocuses images after blurs are corrected. Therefore, an optical system having the image stabilizing function requires a smaller amount of decentering aberration to be generated when the movable lens unit is moved in a direction orthogonal to the optical axis and made in a decentering state.

BRIEF SUMMARY OF THE INVENTION

Accordingly, it is a primary but exemplified object of the present invention to provide a zoom lens system and an optical apparatus using the same, where the zoom lens system has a large aperture but includes such an image stabilizing system having a lightweight and small-diameter image stabilizing lens unit as provides a good optical performance in stabilizing an image, and maintains the entire apparatus compact.

In order to achieve the above object, a zoom lens system of one aspect according to the present invention includes, in order from an object side, a front lens component including, a plurality of lens units for zooming and focusing, and a rear lens component, as a relay lens unit, for forming an image, wherein the rear lens component including, in order from the object side, a lens unit A of positive refractive power, a lens unit B of negative refractive power movable so as to have a component in a direction perpendicular to an optical axis, and a lens unit C of positive refractive power, the image being displaced as the lens unit B moves so as to have the component in the direction perpendicular to an optical axis. According to this zoom lens system, a beam emitted from the front lens component converges by the lens unit A of relatively large positive refractive power. reduces an axial beam incident upon the lens unit B as an image stabilizing lens unit. and thereby reduces a lens diameter of the lens unit B. The lens unit B has relatively large negative refractive power to increase the image stabilizing sensitivity; while the lens unit C has relatively large positive refractive power and corrects an aberration generated by the lens unit B of relatively large negative refractive power. Thereby, the inventive zoom lens may miniaturize the entire apparatus and maintain a high optical performance throughout the entire zoom range or the entire object length in both reference and image stabilizing states.

An optical apparatus of still another aspect according to the present invention includes the aforementioned zoom lens system and a photoelectric conversion element for receiving an image formed by the zoom lens system.

Other objects and further features of the present invention will become readily apparent from the following description of preferred embodiments with reference to accompanying drawings.

BRIEF DESCRIPTION OF THE DRAWINGS

FIG. 4(A) represents a normal state while FIG. 4(B) represents a state where the zoom lens stabilizes an image with an optical axis tilted by 0.5° from the normal state.

FIG. 6(A) represents the normal state while FIG. 6(B) represents the state where the zoom lens has the optical axis tilted by 0.5° from the normal state.

FIG. 9 shows graphic representations of aberrations in the zoom lens system at the wide-angle end of the numerical example 2 when the zoom lens system focuses on an infinite distant object.

FIG. 10(A) represents the normal state and FIG. 10(B) represents the state where the zoom lens has the optical axis tilted by 0.5° from the normal state.

FIG. 12(A) represents the normal state and FIG. 12(B) represents the state where the zoom lens has the optical axis tilted by 0.5° from the normal state.

FIG. 16(A) represents the normal state and FIG. 16(B) represents the state where the zoom lens has the optical axis tilted by 0.5° from the normal state.

FIG. 18(A) represents the normal state and FIG. 18(B) represents the state where the zoom lens has the optical axis tilted by 0.5° from the normal state.

FIG. 21 shows graphic representations of aberrations in the zoom lens system at the wide-angle end of the numerical example 4 when the zoom lens system focuses on an infinite distant object.

FIG. 22(A) represents the normal state and FIG. 22(B) represents the state where the zoom lens has the optical axis tilted by 0.5° from the normal state.

FIG. 24(A) represents the normal state and FIG. 24(B) represents the state where the zoom lens has the optical axis tilted by 0.5° from the normal state.

DETAILED DESCRIPTION OF THE PREFERRED EMBODIMENTS

Figure 1:
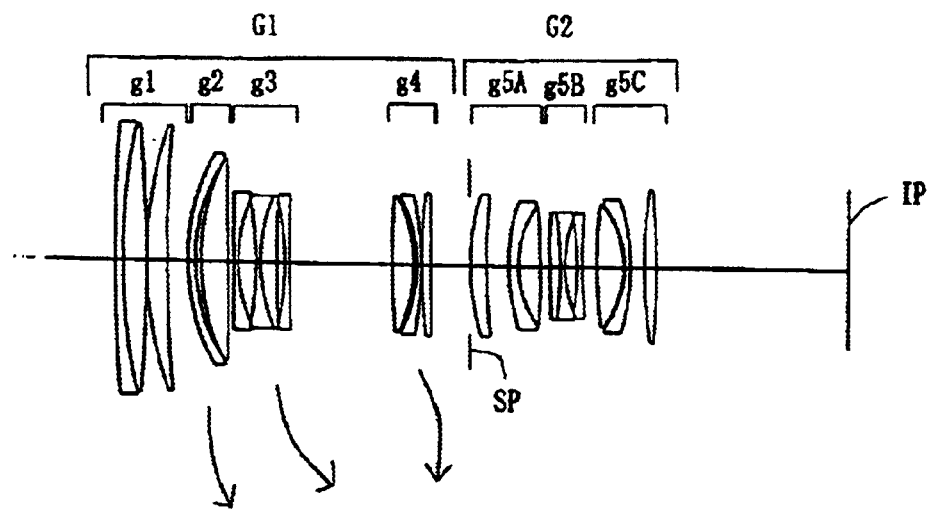
FIG. 1 shows lens sectional view of a zoom lens system at a wide-angle end of numerical example 1 according to the present invention.
Figure 2:
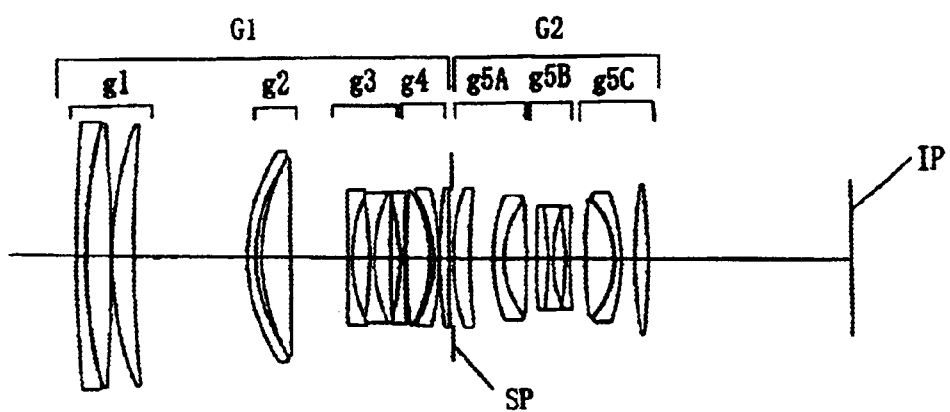
FIG. 2 shows lens sectional view of the zoom lens system at a telephoto end of the numerical example 1.
Figure 3:
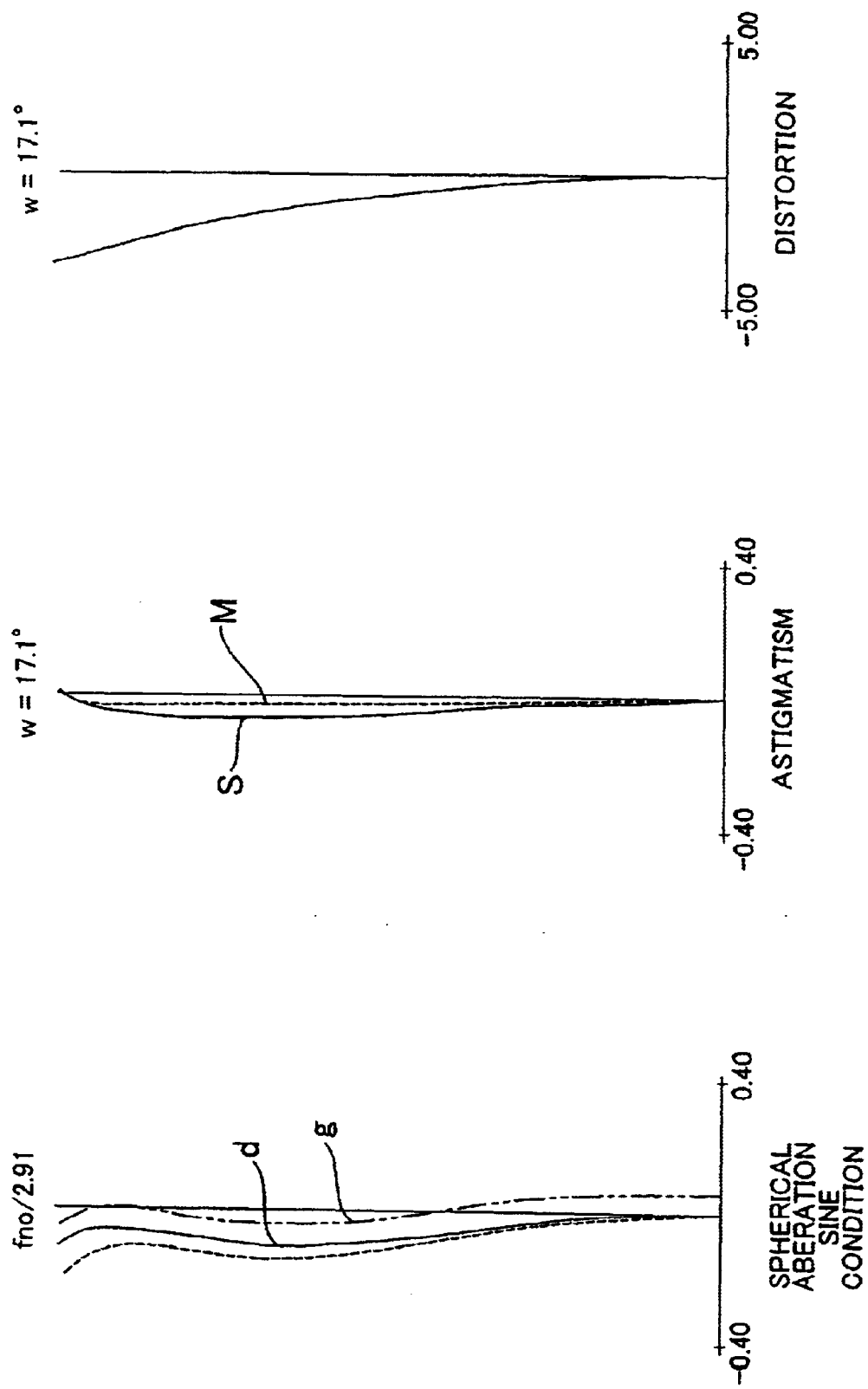
FIG. 3 shows graphic representations of aberrations in the zoom lens system at the wide-angle end of the numerical example 1 when the zoom lens system focuses on an infinite distant object.
Figures 4A, 4B:
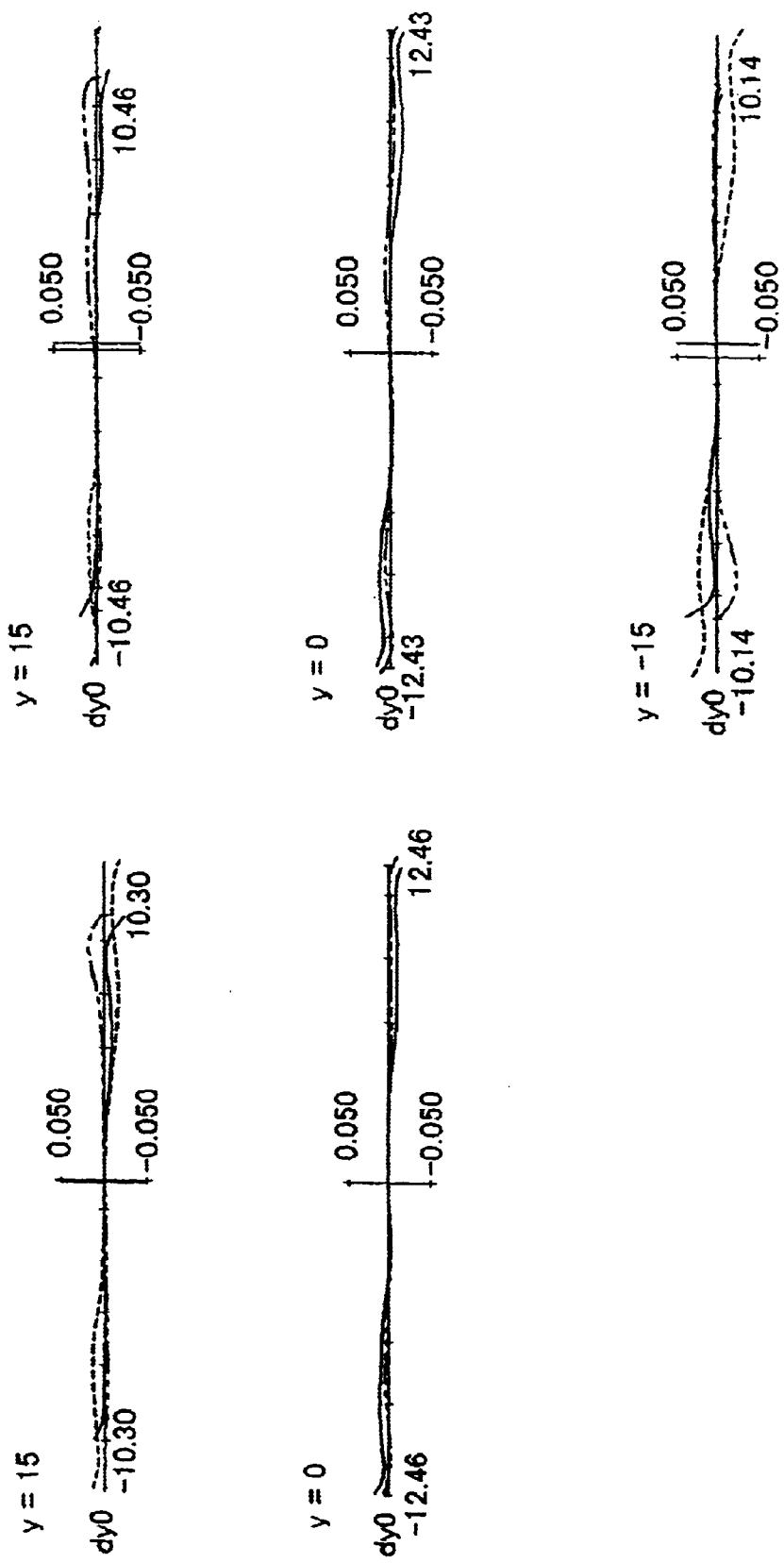
FIGS. 4(A) and 4(B) respectively show graphic representations of aberrations at the wide-angle end in the zoom lens system of the numerical example 1 which focuses on an infinite distant object, where
Figure 5:
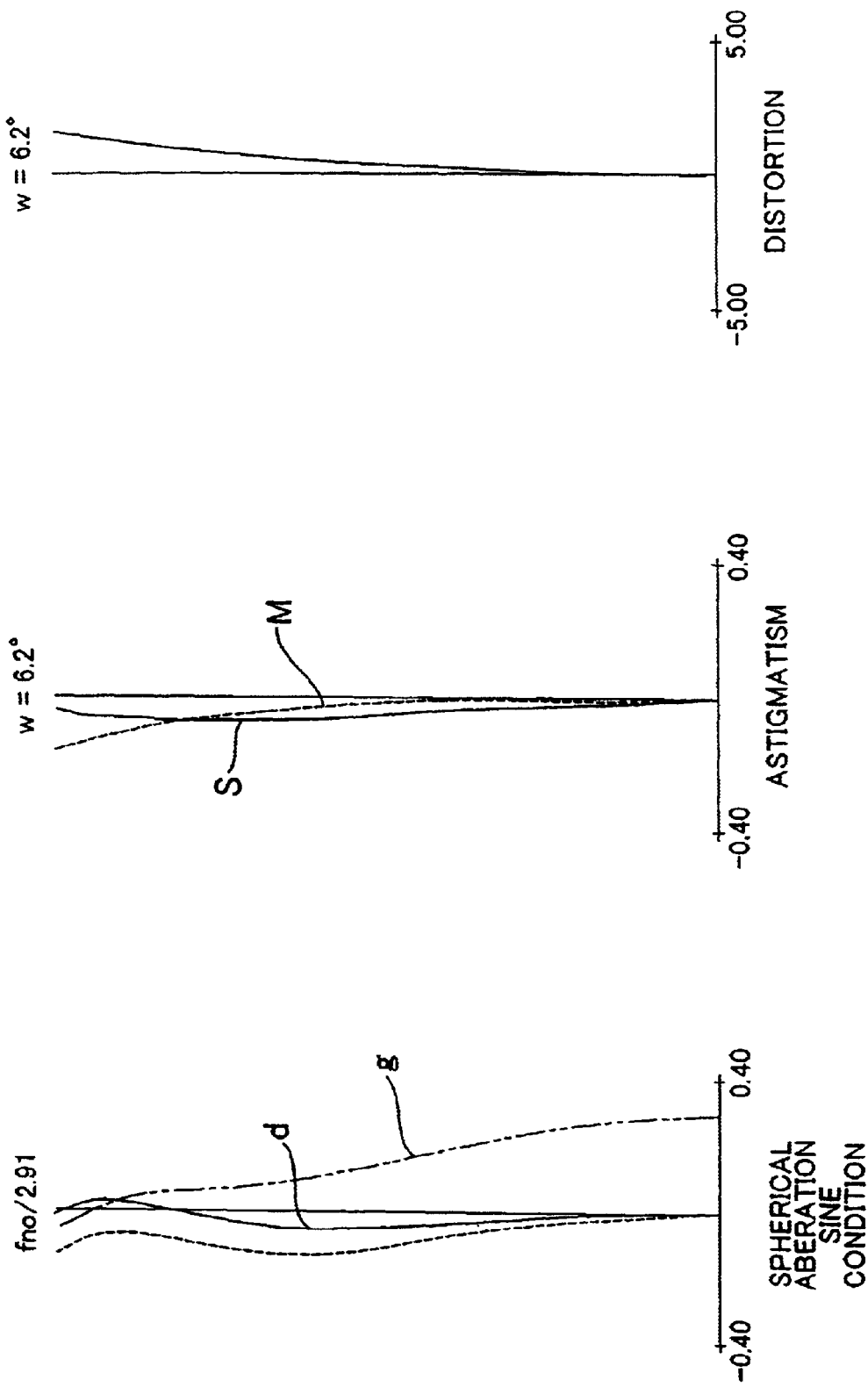
FIG. 5 shows graphic representations of aberrations in the zoom lens system at the telephoto end of the numerical example 1 when the zoom lens system focuses on an infinite distant object.
Figures 6A, 6B:
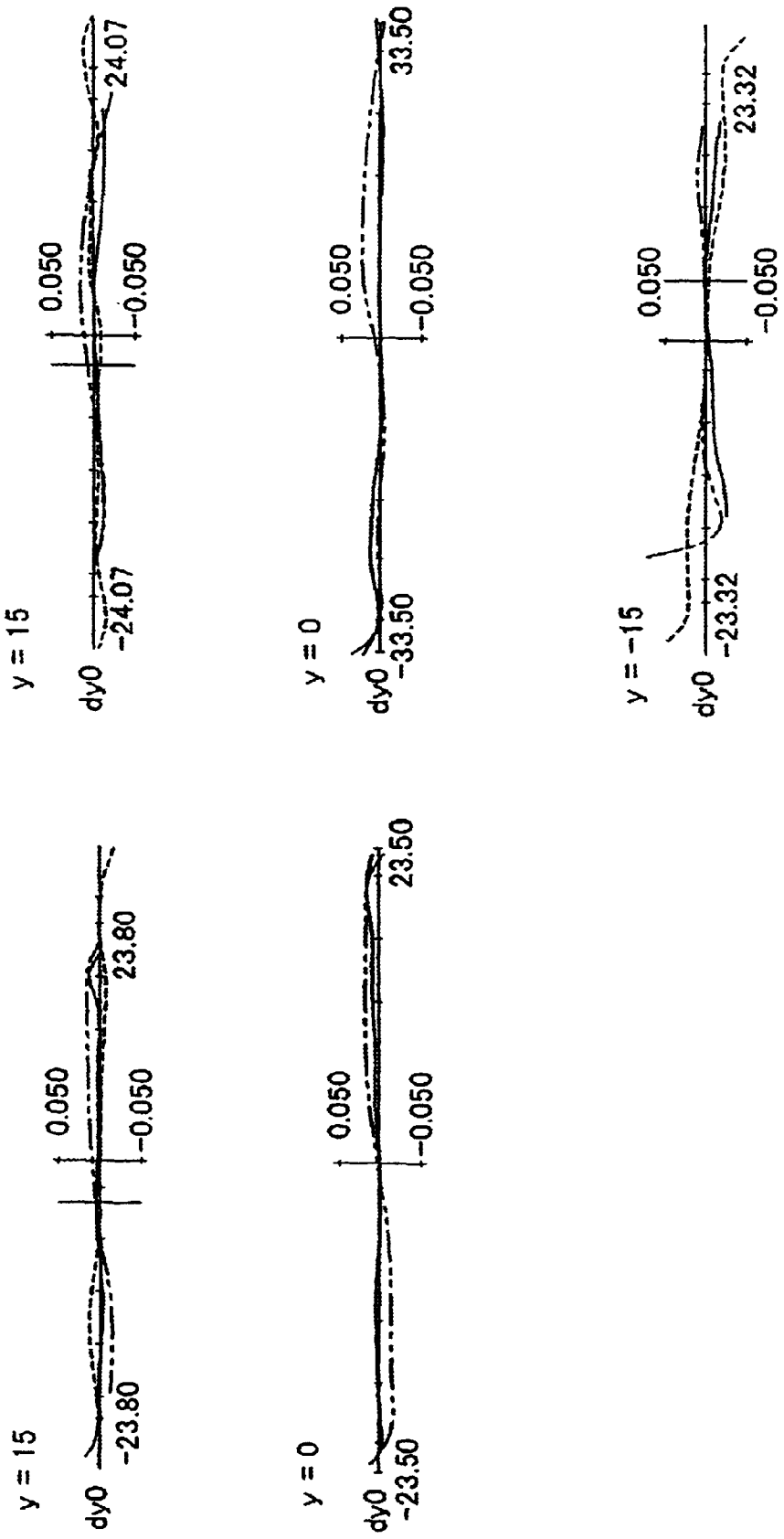
FIGS. 6(A) and 6(B) respectively show graphic representations of aberrations at the telephoto end in the zoom lens system the numerical example 1 which focuses on an infinite distant object, where

FIGS. 1 and 2 show lens sectional view of a zoom lens system at wide-angle and telephoto ends, respectively, of numerical example 1, which will be described later. FIG. 3 shows graphic representations of aberrations in the zoom lens system at the wide-angle end of the numerical example 1, which focuses on an infinite distant object. FIGS. 4(A) and 4(B) respectively show graphic representations of aberrations at the wide-angle end in the zoom lens system of the numerical example 1 which focuses on an infinite distant object, where FIG. 4(A) represents a normal state while FIG. 4(B) represents a state where the zoom lens stabilizes an image with an optical axis tilted by 0.5° from the normal state. FIG. 5 shows graphic representations of aberrations in the zoom lens system at the telephoto end of the numerical example 1 when the zoom lens system focuses on an infinite distant object. FIGS. 6(A) and 6(B) respectively show graphic representations of aberrations at the telephoto end in the zoom lens system the numerical example 1 which focuses on an infinite distant object, where FIG. 6(A) represents the normal state while FIG. 6(B) represents the state where the zoom lens has the optical axis tilted by 0.5° from the normal state.

Figure 7:
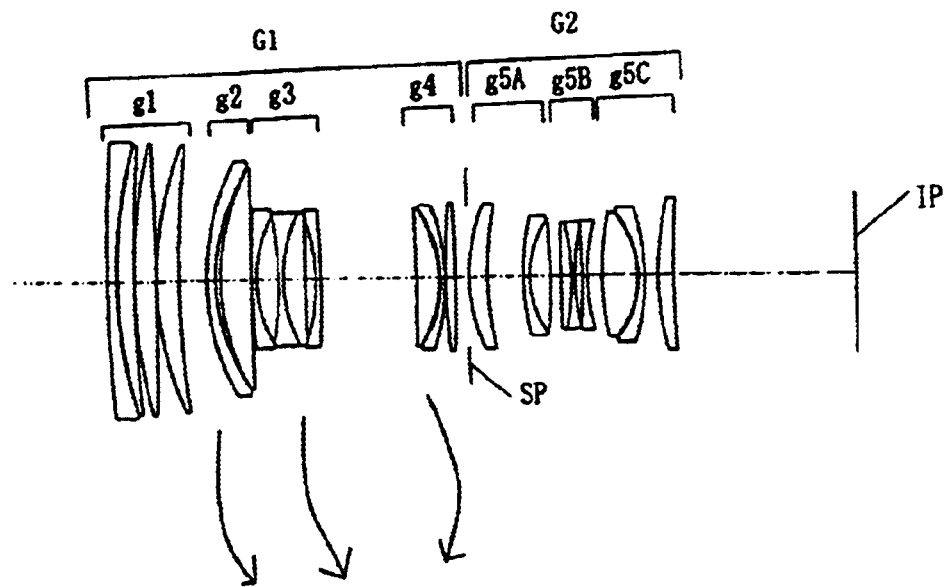
FIG. 7 shows lens sectional view of a zoom lens system at a wide-angle end of numerical example 2 according to the present invention.
Figure 8:
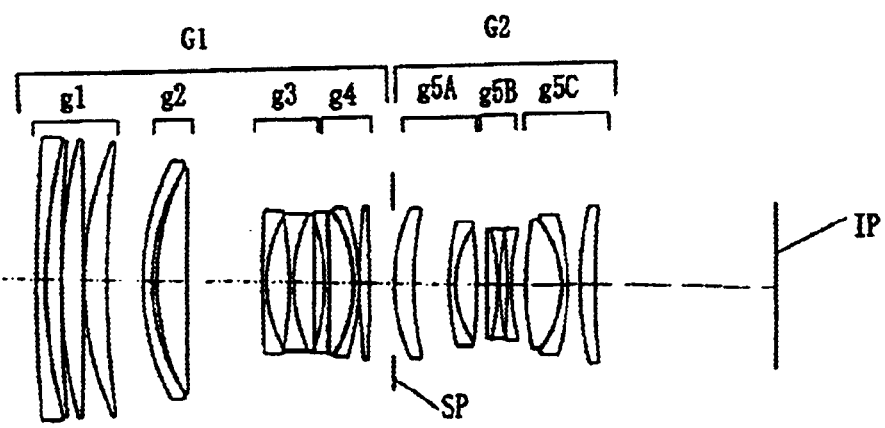
FIG. 8 shows lens sectional view of the zoom lens system at a telephoto end of the numerical example 2.
Figures 10A, 10B:
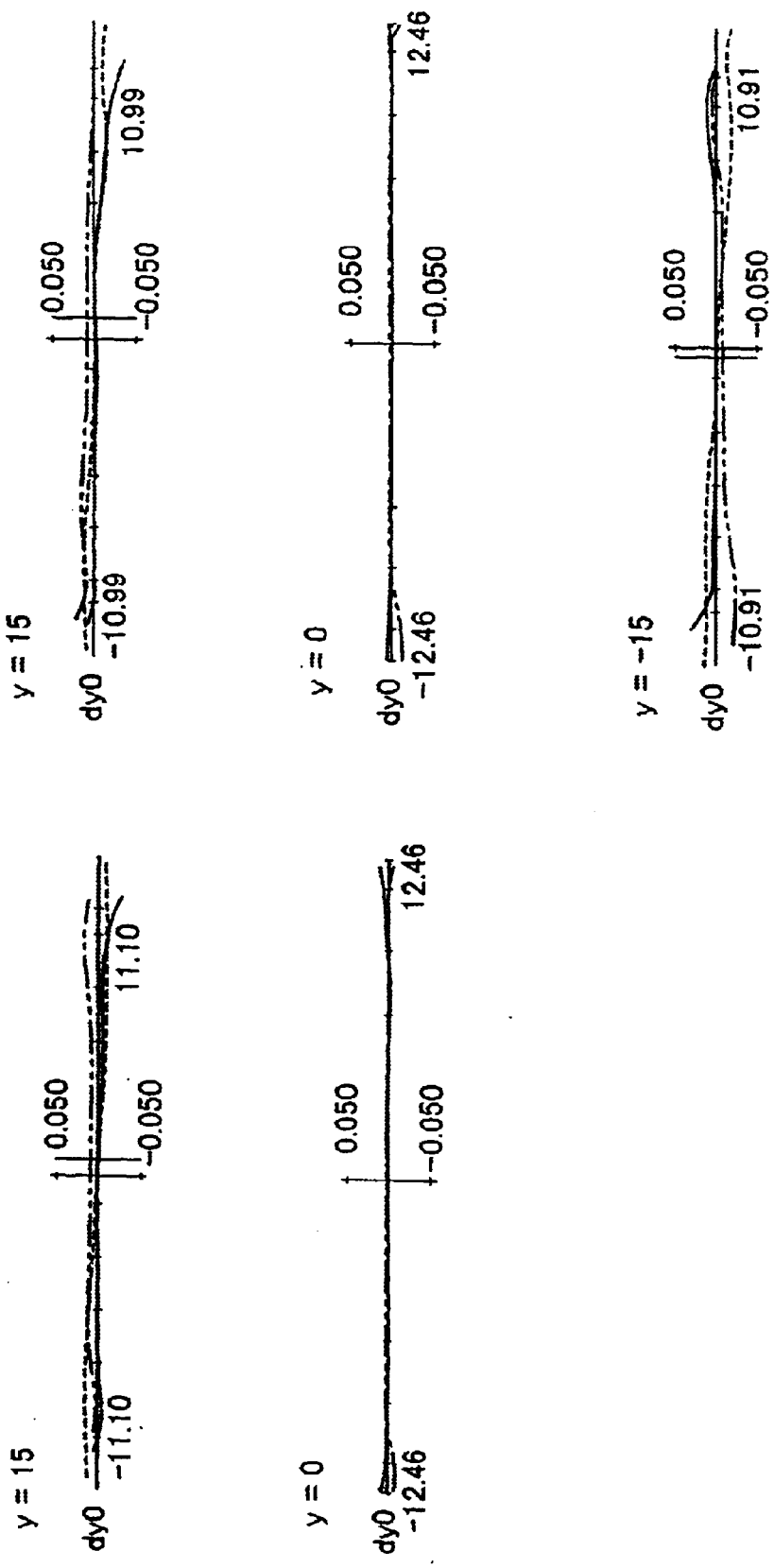
FIGS. 10(A) and 10(B) respectively show graphic representations of aberrations at the wide-angle end in the zoom lens system of the numerical example 2 which focuses on an infinite distant object, where
Figure 11:
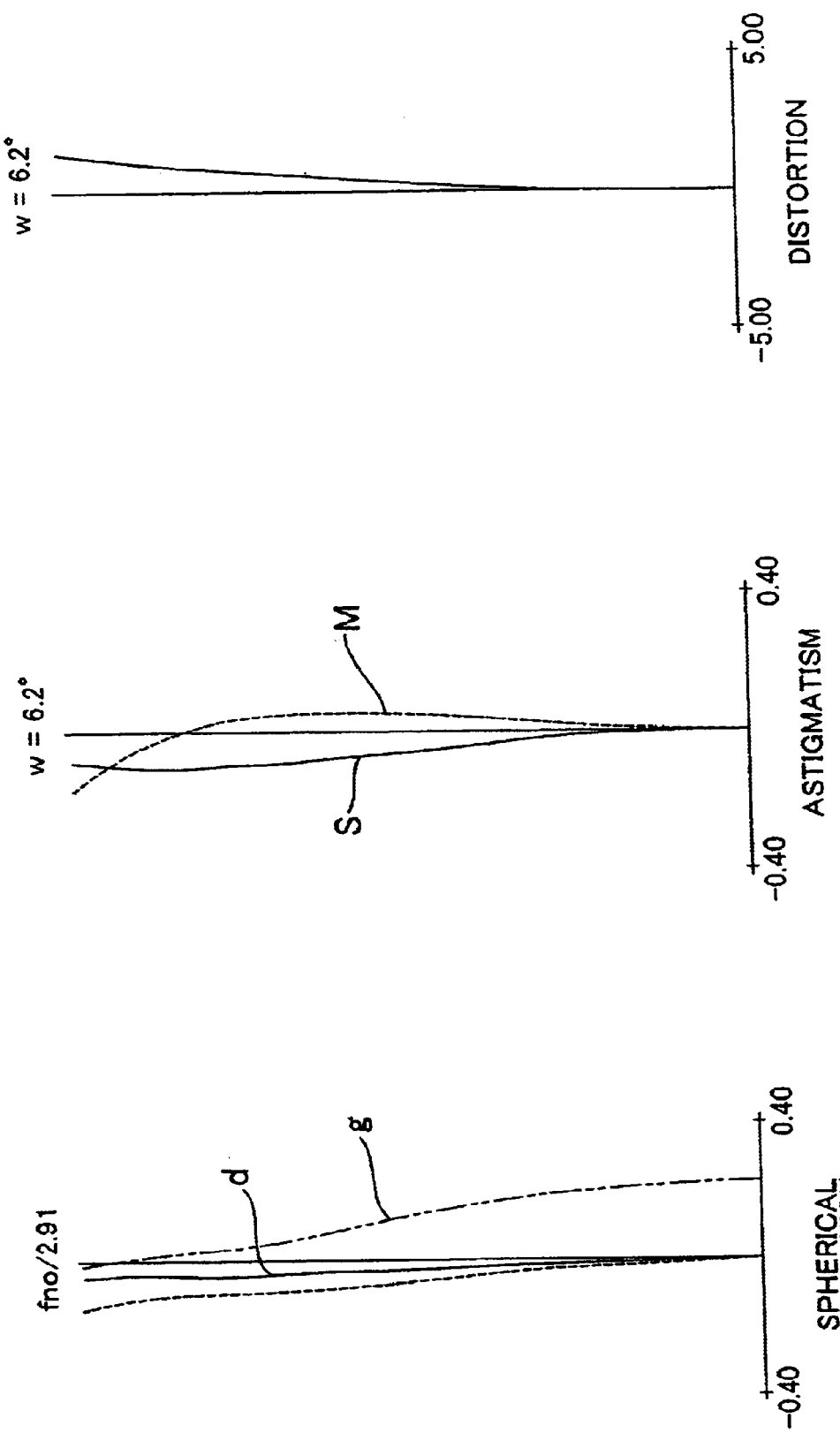
FIG. 11 shows graphic representations of aberrations in the zoom lens system at the telephoto end of the numerical example 2 when the zoom lens system focuses on an infinite distant object.
Figures 12A, 12B:
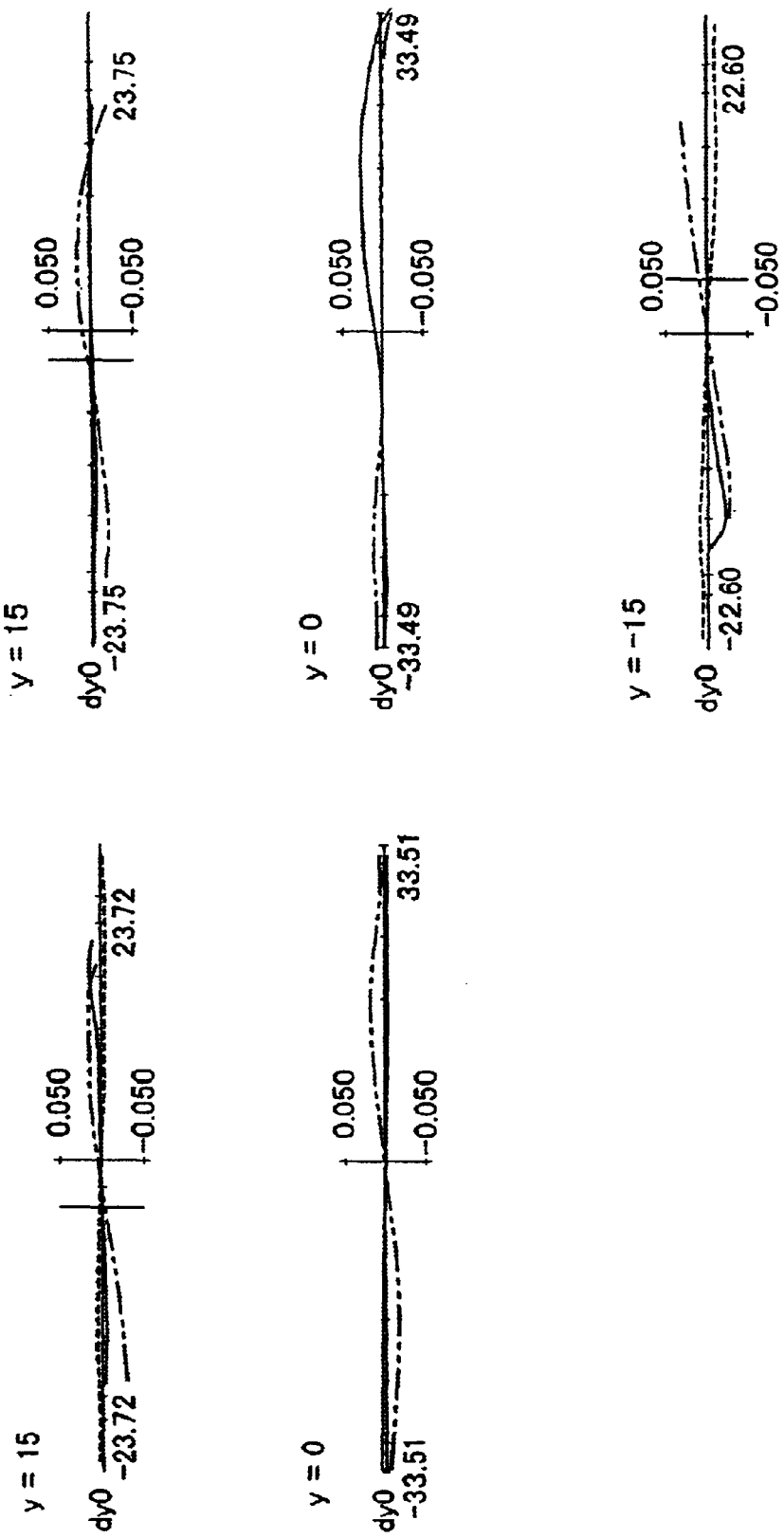
FIGS. 12(A) and 12(B) respectively show graphic representations of aberrations at the telephoto end in the zoom lens system of the numerical example 2 which focuses on an infinite distant object, where

FIGS. 7 and 8 show lens sectional view of a zoom lens system at wide-angle and telephoto ends, respectively, of numerical example 2, which will be described later. FIG. 9 shows graphic representations of aberrations in the zoom lens system at the wide-angle end of the numerical example 2, which focuses on an infinite distant object. FIGS. 10(A) and 10(B) respectively show graphic representations of aberrations at the wide-angle end in the zoom lens system of the numerical example 2 which focuses on an infinite distant object, where FIG. 10(A) represents the normal state and FIG. 10(B) represents the state where the zoom lens has the optical axis tilted by 0.5° from the normal state. FIG. 11 shows graphic representations of aberrations in the zoom lens system at the telephoto end of the numerical example 2 when the zoom lens system focuses on an infinite distant object. FIGS. 12(A) and 12(B) respectively show graphic representations of aberrations at the telephoto end in the zoom lens system of the numerical example 2 which focuses on an infinite distant object, where FIG. 12(A) represents the normal state and FIG. 12(B) represents the state where the zoom lens has the optical axis tilted by 0.5° from the normal state.

Figure 13:
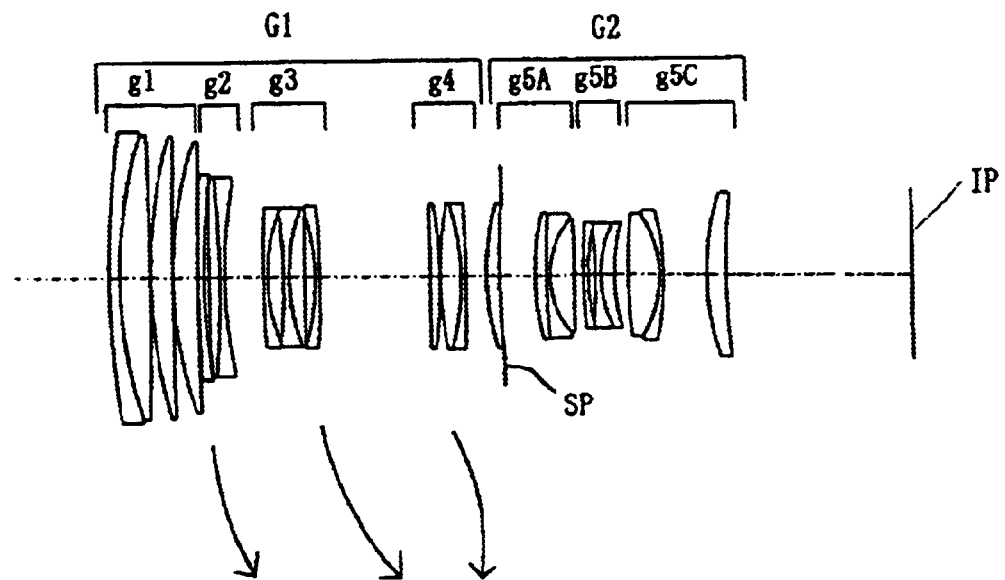
FIG. 13 shows lens sectional view of a zoom lens system at a wide-angle end of numerical example 3 according to the present invention.
Figure 14:
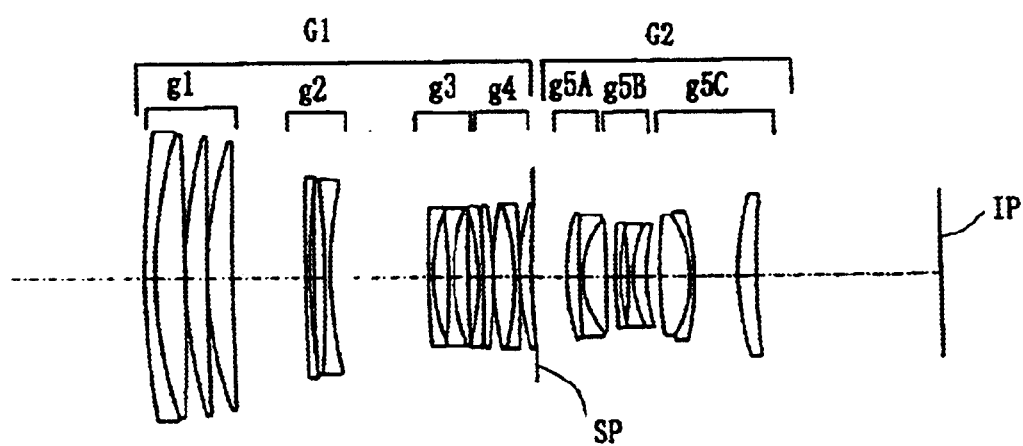
FIG. 14 shows lens sectional view of the zoom lens system at a telephoto end of the numerical example 3.
Figure 15:
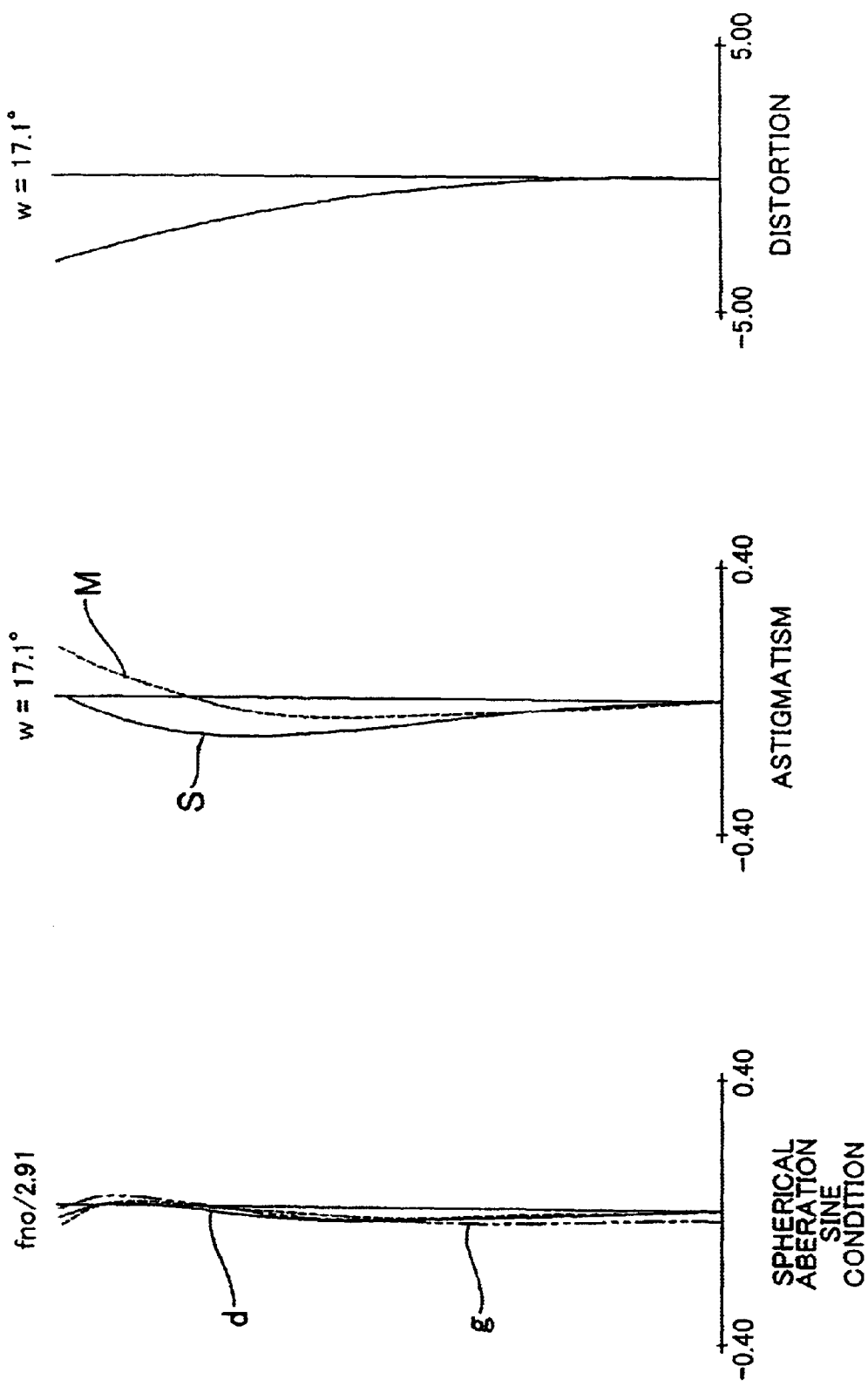
FIG. 15 shows graphic representations of aberrations in the zoom lens system at the wide-angle end of the numerical example 3 when the zoom lens system focuses on an infinite distant object.
Figures 16A, 16B:
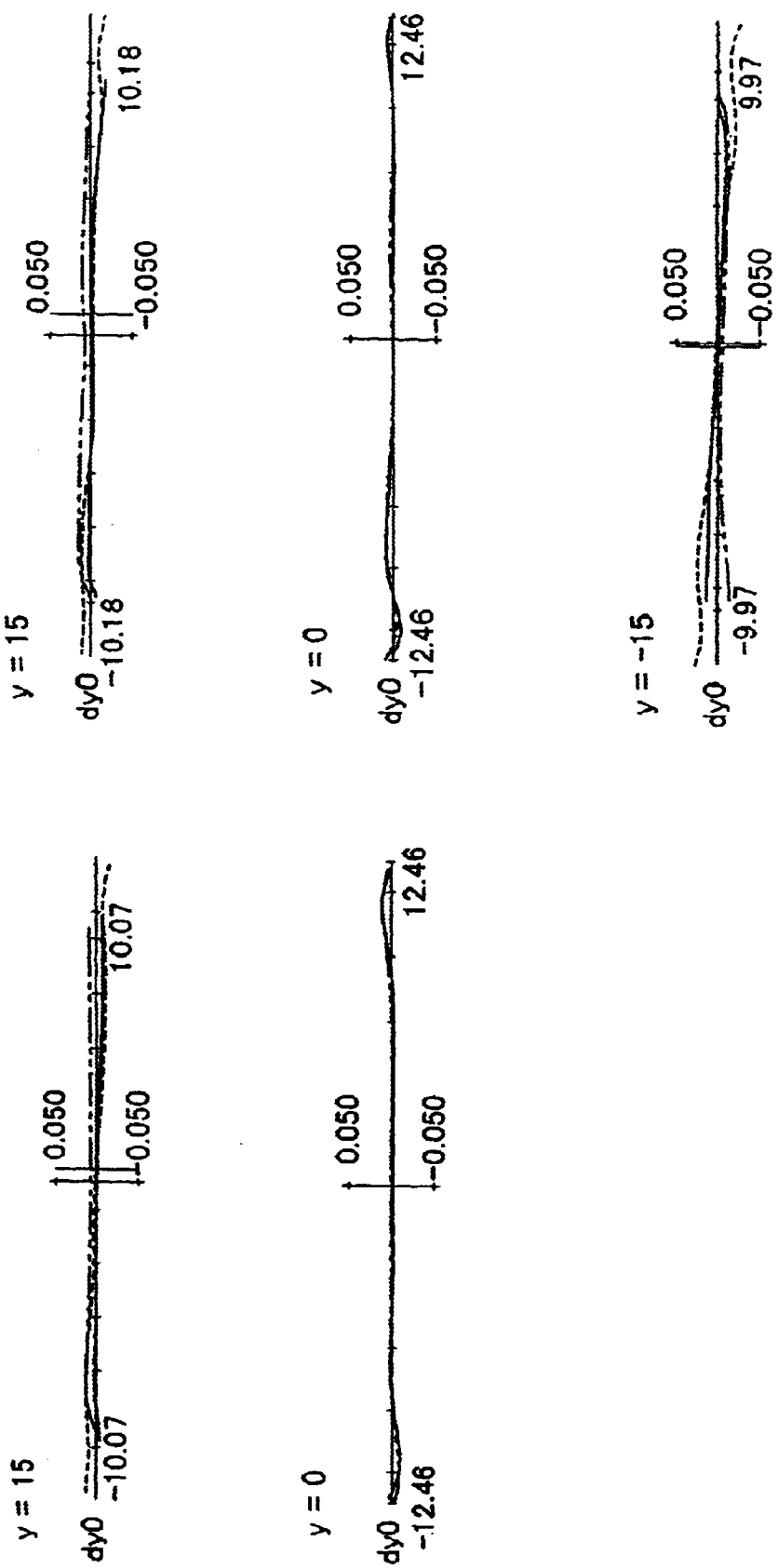
FIGS. 16(A) and 16(B) respectively show graphic representations of aberrations at the wide-angle end in the zoom lens system of the numerical example 3 which focuses on an infinite distant object, where
Figure 17:
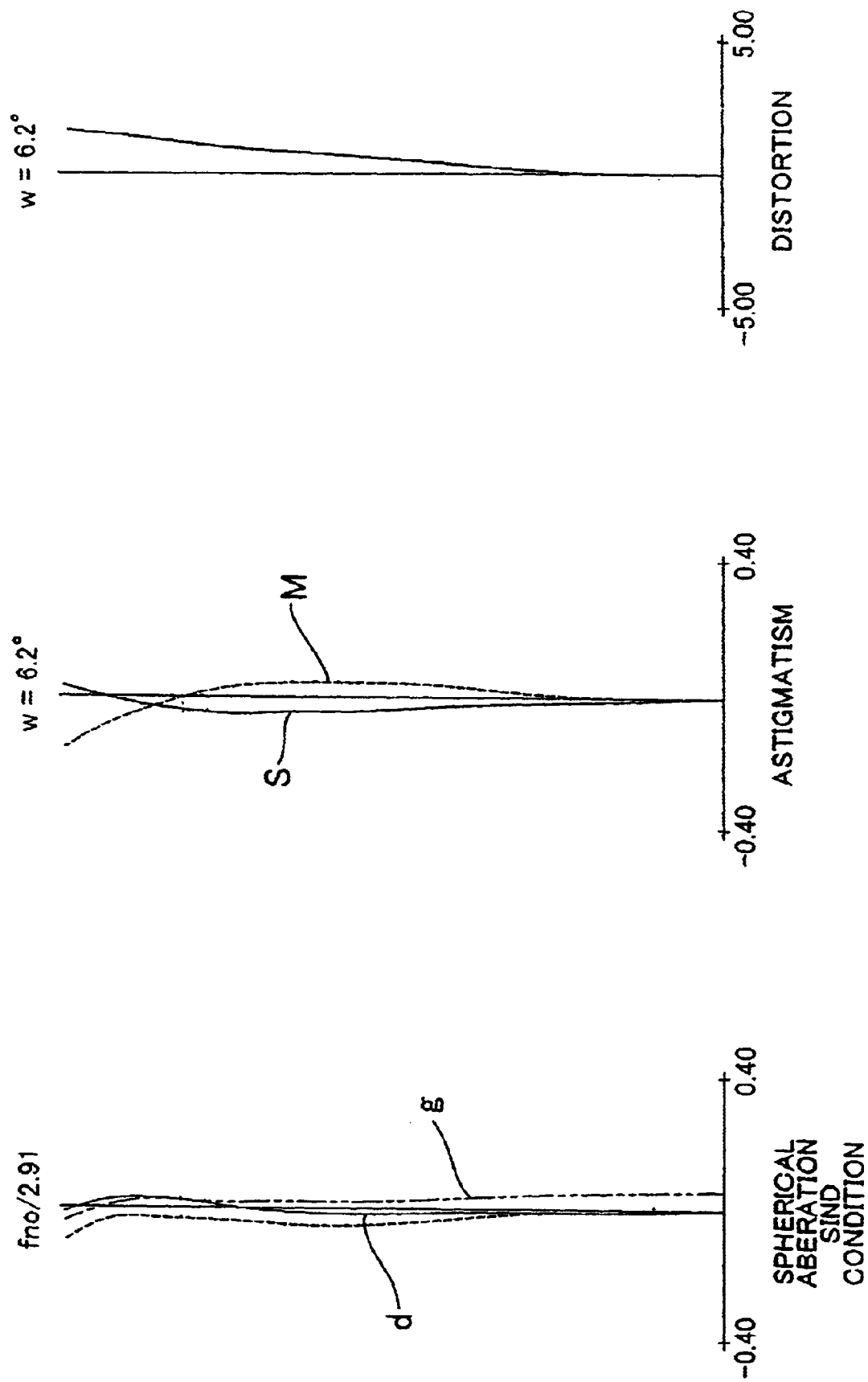
FIG. 17 shows graphic representations of aberrations in the zoom lens system at the telephoto end of the numerical example 3 when the zoom lens system focuses on an infinite distant object.
Figures 18A, 18B:
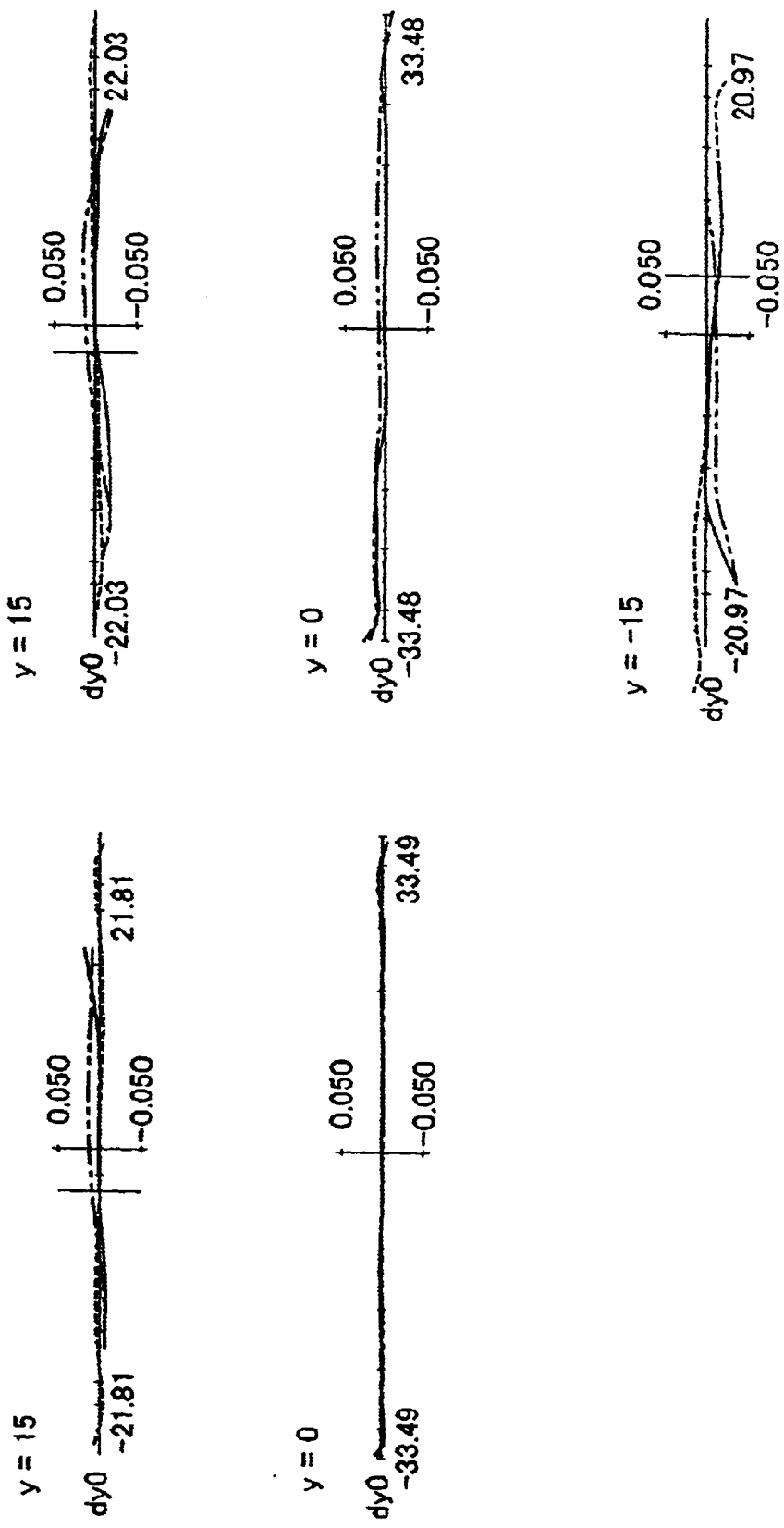
FIGS. 18(A) and 18(B) respectively show graphic representations of aberrations at the telephoto end in the zoom lens system of the numerical example 3 which focuses on an infinite distant object, where

FIGS. 13 and 14 show lens sectional view of a zoom lens system at wide-angle and telephoto ends, respectively, of numerical example 3, which will be described later. FIG. 15 shows graphic representations of aberrations in the zoom lens system at the wide-angle end of the numerical example 3, which focuses on an infinite distant object. FIGS. 16(A) and 16(B) respectively show graphic representations of aberrations at the wide-angle end in the zoom lens system of the numerical example 3 which focuses on an infinite distant object, where FIG. 16(A) represents the normal state and FIG. 16(B) represents the state where the zoom lens has the optical axis tilted by 0.5° from the normal state. FIG. 17 shows graphic representations of aberrations in the zoom lens system at the telephoto end of the numerical example 3 when the zoom lens system focuses on an infinite distant object. FIGS. 18(A) and 18(B) respectively show graphic representations of aberrations at the telephoto end in the zoom lens system of the numerical example 3 which focuses on an infinite distant object, where FIG. 18(A) represents the normal state and FIG. 18(B) represents the state where the zoom lens has the optical axis tilted by 0.5° from the normal state.

Figure 19:
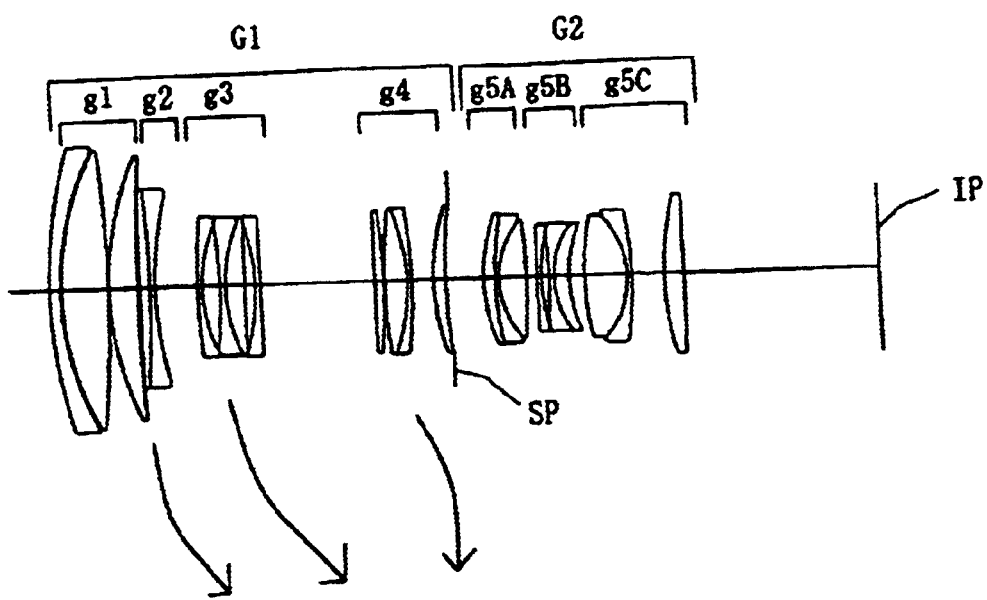
FIG. 19 shows lens sectional view of a zoom lens system at a wide-angle end of numerical example 4 according to the present invention.
Figure 20:
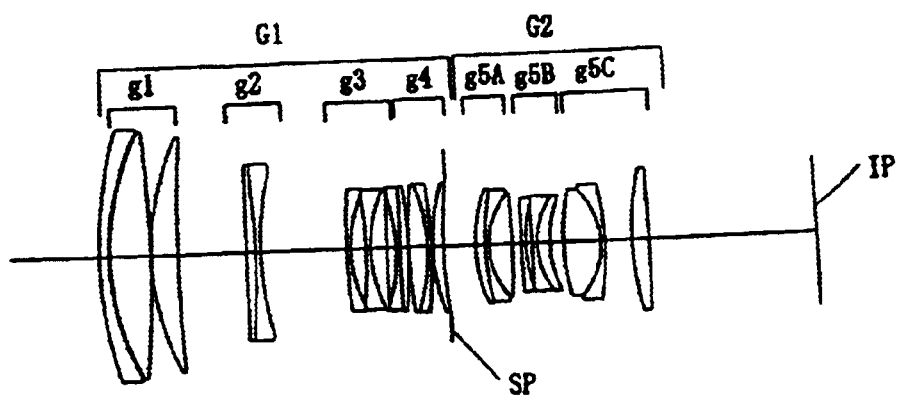
FIG. 20 shows lens sectional view of the zoom lens system at a telephoto end of the numerical example 4.
Figures 22A, 22B:
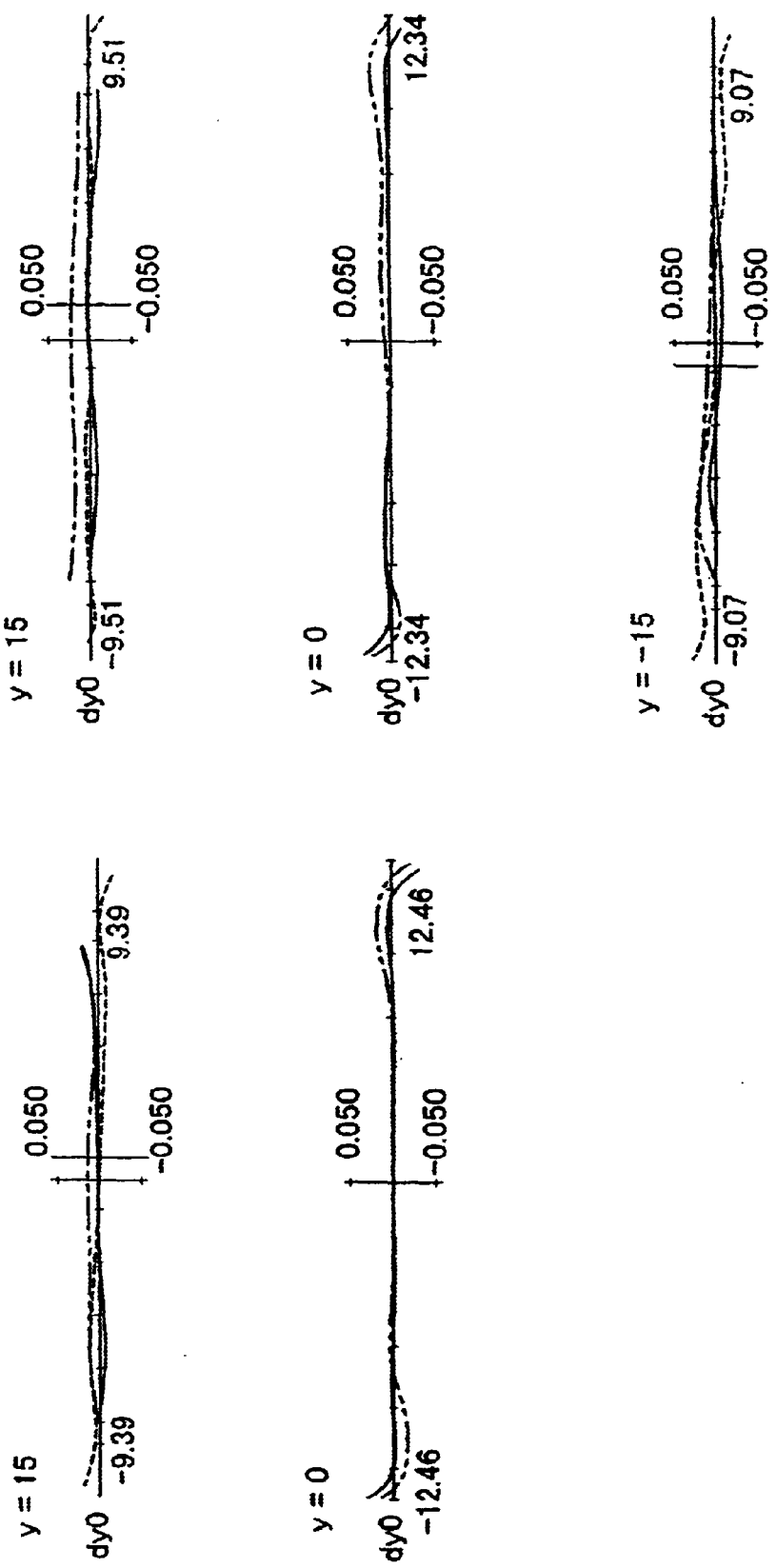
FIGS. 22(A) and 22(B) respectively show graphic representations of aberrations at the wide-angle end in the zoom lens system of the numerical example 4 which focuses on an infinite distant object, where
Figure 23:
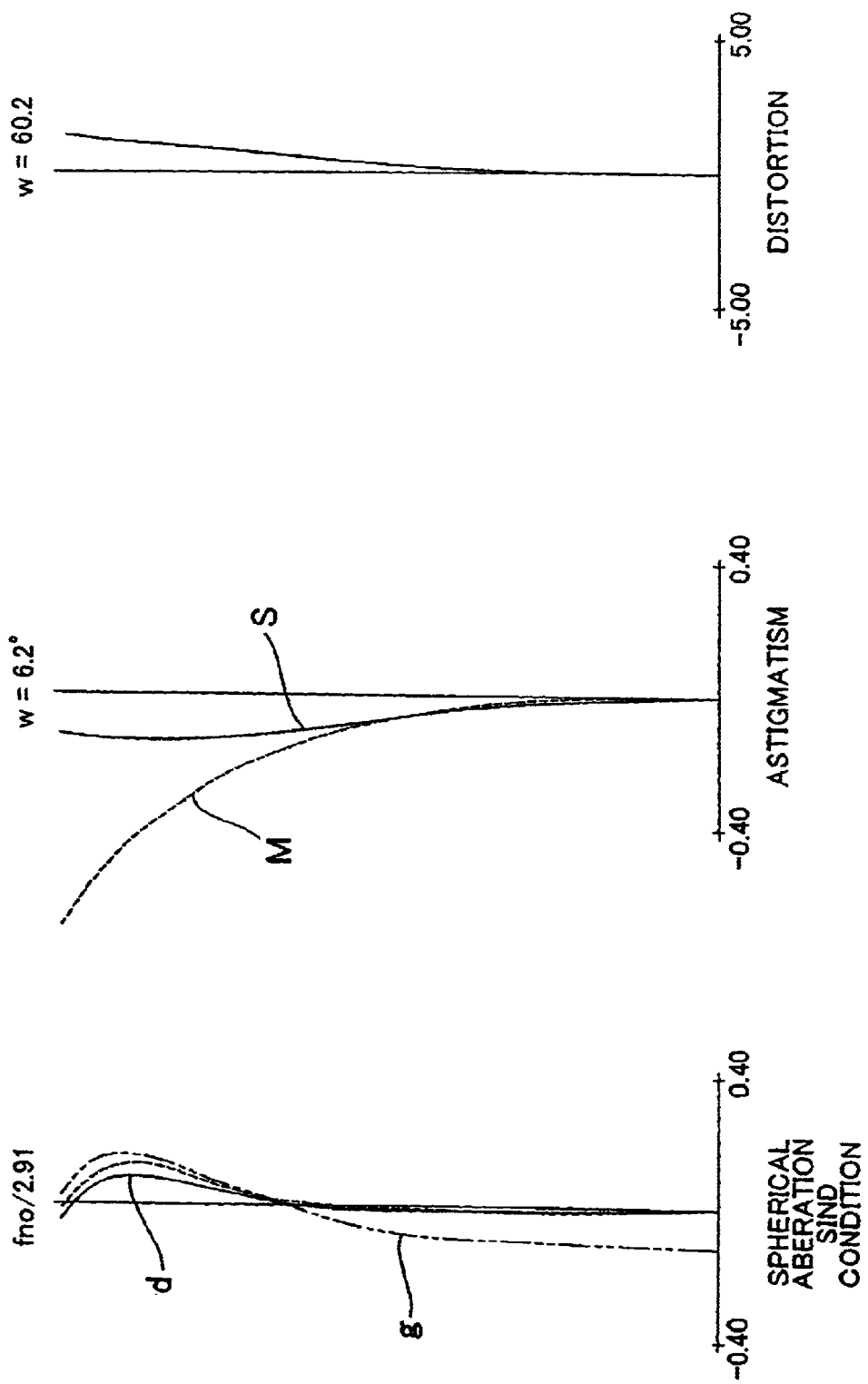
FIG. 23 shows graphic representations of aberrations in the zoom lens system at the telephoto end of the numerical example 4 when the zoom lens system focuses on an infinite distant object.
Figures 24A, 24B:
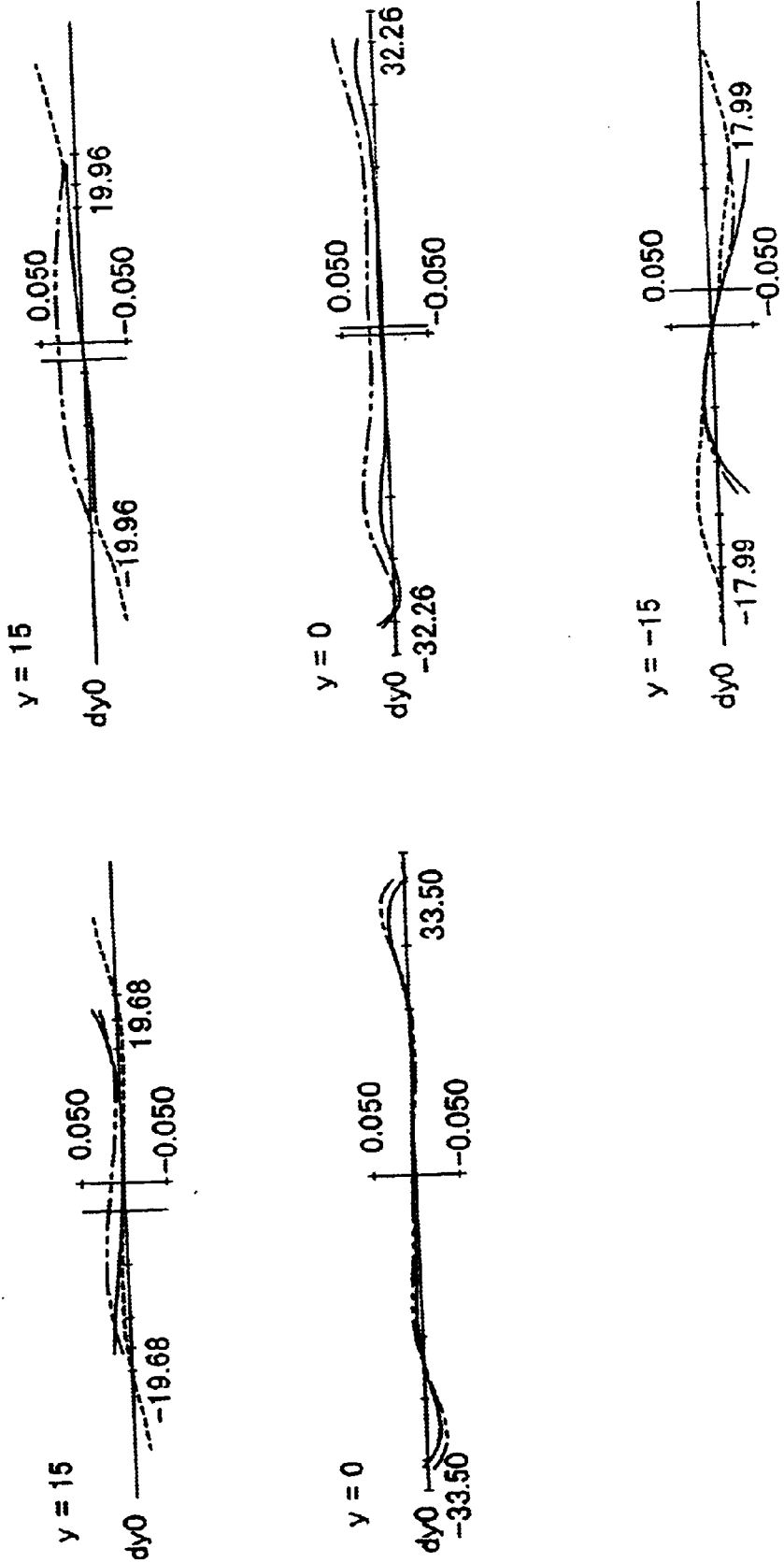
FIGS. 24(A) and 24(B) respectively show graphic representations of aberrations at the telephoto end in the zoom lens system of the numerical example 4 which focuses on an infinite distant object, where

FIGS. 19 and 20 show lens sectional view of a zoom lens system at wide-angle and telephoto ends, respectively, of numerical example 4, which will be described later. FIG. 21 shows graphic representations of aberrations in the zoom lens system at the wide-angle end of the numerical example 4, which focuses on an infinite distant object. FIGS. 22(A) and 22(B) respectively show graphic representations of aberrations at the wide-angle end in the zoom lens system of the numerical example 4 which focuses on an infinite distant object, where FIG. 22(A) represents the normal state and FIG. 22(B) represents the state where the zoom lens has the optical axis tilted by 0.5° from the normal state. FIG. 23 shows graphic representations of aberrations in the zoom lens system at the telephoto end of the numerical example 4 when the zoom lens system focuses on an infinite distant object. FIGS. 24(A) and 24(B) respectively show graphic representations of aberrations at the telephoto end in the zoom lens system of the numerical example 4 which focuses on an infinite distant object, where FIG. 24(A) represents the normal state and FIG. 24(B) represents the state where the zoom lens has the optical axis tilted by 0.5° from the normal state.

In a lens sectional view in each numerical example, G1 is a front lens component including a plurality of lens units for zooming and focusing. G2 is a rear lens component, as a relay lens, for forming an image.

The front lens component G1 includes, in order from an object side, first lens unit g1 of positive refractive power, second lens unit g2 of positive or negative refractive power, third lens unit g3 of negative refractive power, and fourth lens unit g4 of positive refractive power. During zooming from a wide-angle end (with the shortest focal length) to a telephoto end (with the longest focal length), the second, third and fourth lens units g2, g3, and g4 are moved as in arrows in the lens sectional view such that a separation between the first and second lens units g1 and g2 keeps constant or increases, a separation between the second and third lens units g2 and g3 increases, and a separation between the third and fourth lens units g3 and g4 changes.

The rear lens component G2 includes, in order from the object side, a lens unit g5A (or lens unit A) of positive refractive power which does not move in the direction perpendicular to the optical axis, a lens unit g5B (or lens unit B) of negative refractive power which may be moved in the direction perpendicular to the optical axis so as to correct blurs in an image when the zoom lens vibrates, and a lens unit g5C (or lens unit C) of positive refractive power which does not move in the direction perpendicular to the optical axis. Focusing associates with the movement of the second lens unit g2 in the optical axis direction. SP is an aperture stop, and IP is an image plane.

The zoom lens in this embodiment moves the third lens unit g3 of negative refractive power is moved toward the image side during zooming so as to increase the magnification, and corrects resultant fluctuations of an image point by primarily moving the fourth lens unit g4 of positive refractive power.

A description will now be given of the lens unit G1 including a plurality of lens units for zooming and focusing.

The zoom lens in this embodiment reduces the weight of the second lens unit g2 as the focus lens unit for auto focus purposes. In the known front (first unit) focusing, when the front weight becomes heavy in such a large-aperture lens system as the F-number of 2.8 and the close range is set to be as relatively short as about 1.5 m, the drawing amount for the focus lens unit disadvantageously becomes large. In addition, the spherical aberration particularly increases resulting in the insufficient correction at close range at the telephoto end, as the front lens's power (i.e., refractive power) becomes strong to reduce the drawing amount of the focus lens unit. Accordingly, the instant embodiment uses the second lens unit as the focus unit and reduces a diameter of the focus lens by diminishing a beam of incidence on the axial beam.

A description will now be given of the rear lens component G2 for forming an image. A beam emitted from the front lens component G1 converges through the lens unit g5A of relatively strong positive power, and diminishes the light incident upon the lens unit g5B as an image stabilizing lens unit on the axial beam. The lens unit g5B has larger refractive power to increase the image stabilizing sensitivity, while the lens unit g5C has relatively large positive power so as to correct an aberration generated by the lens unit g5B of large negative power.

The instant embodiment thus configures the lens units and obtains a high optical performance in both reference or normal and image stabilizing states throughout the zooming range or entire object length.

The zoom lens system of the instant embodiment may adopt at least one of the following configurations to obtain a better optical performance:

(a-1) The following equations are satisfied:

$$-2.5 < f5A/f5B < -1.0 \quad (1)$$

$$-2.5 < f5C/f5B < -1.0 \quad (2)$$

$$-1.0 < f5B/fw < -0.1 \quad (3)$$

where f5A, f5B, and f5C are focal lengths of the lens units A, B and C, respectively, and fw is a focal length of the entire lens system at wide-angle end.

The equation (1) indicates an optical power ratio between the lens unit g5A and the image stabilizing lens unit g5B in the rear lens component G2 as an image forming lens system. The weaker power of the lens unit g5A beyond the upper limit value would increase the lens diameter of the lens unit g5B, thereby hampering the miniaturization of the image stabilizing lens unit g5B and deteriorating the aberrational balance with the lens unit g5B, in particular, a canceling performance of the spherical aberration. On the other hand, the stronger power of the lens unit g5A beyond the lower limit would facilitate the miniaturization of the lens unit B but deteriorate the aberrational balance, thereby leading to insufficient correction to the spherical aberration.

The equation (2) indicates an optical power ratio between the lens unit g5C and the image stabilizing lens unit g5B in the rear lens component G2. The weaker power of the lens unit g5C beyond the upper limit value would result in an excessive correction to the spherical aberration generated in the lens unit g5B, whereas the stronger power of the lens unit C beyond the lower limit value would result in an insufficient correction of the spherical aberration generated in the lens unit g5B.

The equation (3) relates power of the image stabilizing lens unit g5B. The weaker power of the lens unit g5B beyond the upper limit value would be advantageously correct aberrations in stabilizing an image, but result in such a large lens diameter and a large mobile amount in the direction perpendicular to the optical axis in stabilizing an image due to the lowed power that the mechanical burden increases. On the other hand, the stronger power of the lens unit g5B beyond the lower limit value might reduce the lens diameter, and the mobile amount in the direction perpendicular to the optical axis in stabilizing an image, but deteriorate the spherical aberration and astigmatism.

(a-2) The lens unit g5B may include one or more positive lenses and two or more negative lenses.

The image stabilizing lens unit g5 has relatively large negative power rather than the entire lens system. The image stabilizing lens unit g5B made of one negative lens would become advantageous in weight, but result in an insufficient optical performance in stabilizing an image. The image stabilizing lens unit g5B made of two of positive and negative lens could easily correct chromatic aberration, but result in a large mobile amount in the direction perpendicular to the optical axis due to the insufficient lens power even in stabilizing an image. Therefore, the lens unit g5B preferably includes at least one positive lens and at least two negative lenses, thereby keeping the large lens power, reducing the moving amount in the direction perpendicular to the optical axis in stabilizing an image, and maintaining the good optical performance.

(a-3) The front lens component G1 includes, in order from the object side, a first lens unit g1 of positive refractive power, a second lens unit g2 of positive or negative refractive power, a third lens unit g3 of negative refractive power, and a fourth lens unit g4 of positive refractive power, wherein during zooming, a separation between the first and second lens units g1 and g2 is fixed or increases, a separation between the second and third lens units g2 and g3 increases, and a separation between the third and fourth lens units g3 and g4 changes.

(a-4) The second lens unit may move along the optical axis for focusing.

(a-5) The first lens unit and the lens unit G2 may not move for zooming.

(a-6) The following condition may be satisfied where Bf is a distance from an image plane to a vertex in an image-side lens surface of a lens closest to the image, and ft is a focal length of an entire lens system at a telephoto end:

$$Bf/ft > 0.25 \quad (4)$$

The equation (4) indicates a ratio of a distance (i.e., a back focus) from a vertex in the image-side surface of the lens closest to the image side to the shot surface relative to the focal distance of the entire lens system at the telephoto end. As the focal distance ft exceeding the lower limit value would make difficult the attachment, for example, between the lens body and the camera body.

The above structure provides a good image stabilizing function and a good aberrational correction to a zoom lens system, suitable for video camera, video still camera, cameras using a silver halide film etc., which has an angle of field from about 34° to 12°, an F number of about 2.8.

Figure 25:
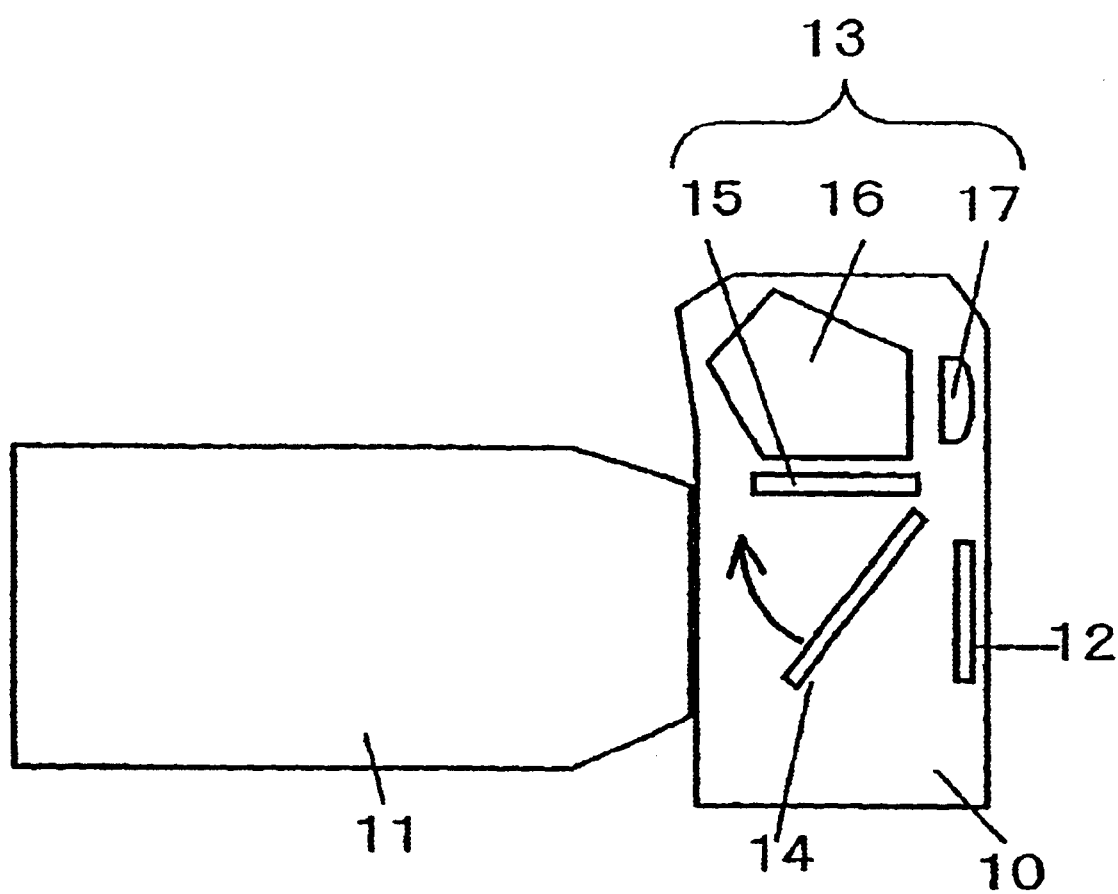
FIG. 25 is schematic view of a principal part in an optical apparatus using the zoom lens system according to the present invention.

Next follows a description of a single lens reflex camera (as an optical apparatus) using a zoom lens system as an image pick-up system of an embodiment according to the present invention, with reference to FIG. 25.

In FIG. 24, 10 denotes a camera body, 11 denotes an image pick-up optical system including the zoom lens of the present invention, 12 denotes an image-taking device ("a photoelectric conversion element") such as a CCD or a silver halide film which receives a subject image from the image pick-up optical system 11, 13 denotes a finder system including a focus plate 15 on which a subject image is formed, 14 denotes a quick-return mirror, pentagonal prism 16 as image inversion means, and an eyepiece 17 for observing the subject image on the focus plate 15.

Thus, an application of the inventive zoom lens system to a camera such as a video camera, a digital still camera, a single lens reflex camera etc., would render small the optical apparatus and enhance the optical performance.

Next follows numerical data for numerical examples. In each numerical example, "ri" represents a radius of curvature of the i-th surface in order from the object side. "di" represents a thickness of the i-th optical member or a separation of air in order from the object side. "ni" and "vi" are the refractive index and Abbe number of the material of the i-th optical member in order from the object side.

Each Table shows a relationship between the above equations and various numerical values in the numerical examples.

Numerical Example 1

| | f = 72.49805 | | fno = 1:2.9 | | $2\omega = 34.2°\sim12.4°$ | | |
|---|---|---|---|---|---|---|---|
| r1 = | 419.962 | d1 = | 2.80 | n1 = | 1.74950 | v1 = | 35.3 |
| r2 = | 132.534 | d2 = | 0.23 | | | | |
| r3 = | 138.957 | d3 = | 7.52 | n2 = | 1.49700 | v2 = | 81.5 |
| r4 = | −407.574 | d4 = | 0.10 | | | | |
| r5 = | 90.528 | d5 = | 6.64 | n3 = | 1.49700 | v3 = | 81.5 |
| r6 = | 332.596 | d6 = | Variable | | | | |
| r7 = | 47.719 | d7 = | 2.50 | n4 = | 1.84666 | v4 = | 23.8 |
| r8 = | 41.657 | d8 = | 1.82 | | | | |
| r9 = | 49.949 | d9 = | 8.77 | n5 = | 1.48749 | v5 = | 70.2 |
| r10 = | 6214.652 | d10 = | Variable | | | | |
| r11 = | 1840.842 | d11 = | 1.40 | n6 = | 1.80610 | v6 = | 40.9 |
| r12 = | 36.505 | d12 = | 5.55 | | | | |
| r13 = | −86.160 | d13 = | 1.40 | n7 = | 1.48749 | v7 = | 70.2 |
| r14 = | 38.587 | d14 = | 5.08 | n8 = | 1.84666 | v8 = | 23.8 |
| r15 = | 422.938 | d15 = | 2.47 | | | | |
| r16 = | −67.770 | d16 = | 1.40 | n9 = | 1.71299 | v9 = | 53.9 |
| r17 = | 304.729 | d17 = | Variable | | | | |
| r18 = | 218.633 | d18 = | 7.01 | n10 = | 1.49700 | v10 = | 81.5 |
| r19 = | −34.066 | d19 = | 1.10 | | | | |
| r20 = | −32.873 | d20 = | 1.45 | n11 = | 1.66680 | v11 = | 33.0 |
| r21 = | −82.289 | d21 = | 0.15 | | | | |
| r22 = | 138.166 | d22 = | 3.00 | n12 = | 1.84666 | v12 = | 23.8 |
| r23 = | ∞ | d23 = | Variable | | | | |
| r24 = | ∞ Stop | d24 = | 0.25 | | | | |
| r25 = | 53.680 | d25 = | 5.00 | n13 = | 1.77250 | v13 = | 49.6 |
| r26 = | 138.666 | d26 = | 7.32 | | | | |
| r27 = | 44.371 | d27 = | 3.00 | n14 = | 1.84666 | v14 = | 23.8 |
| r28 = | 23.175 | d28 = | 0.15 | | | | |
| r29 = | 23.436 | d29 = | 7.00 | n15 = | 1.60311 | v15 = | 60.6 |
| r30 = | −203.339 | d30 = | Variable | | | | |
| r31 = | 269.475 | d31 = | 3.50 | n16 = | 1.84666 | v16 = | 23.8 |
| r32 = | −82.499 | d32 = | 1.35 | n17 = | 1.69350 | v17 = | 53.2 |
| r33 = | 31.261 | d33 = | 3.90 | | | | |
| r34 = | −66.833 | d34 = | 1.35 | n18 = | 1.69350 | v18 = | 53.2 |
| r35 = | 136.353 | d35 = | Variable | | | | |
| r36 = | 113.450 | d36 = | 8.89 | n19 = | 1.49700 | v19 = | 81.5 |
| r37 = | −22.151 | d37 = | 0.50 | | | | |
| r38 = | −22.027 | d38 = | 1.80 | n20 = | 1.83400 | v20 = | 37.2 |
| r39 = | −49.895 | d39 = | 4.22 | | | | |
| r40 = | 117.787 | d40 = | 4.00 | n21 = | 1.83400 | v21 = | 37.2 |
| r41 = | −182.364 | | | | | | |

TABLE 1

| VARIABLE | FOCAL LENGTH | | |
|---|---|---|---|
| SEPARATION | 72.50 | 99.50 | 194.99 |
| d 6 | 7.03 | 13.28 | 34.81 |
| d 10 | 1.80 | 9.85 | 17.55 |
| d 17 | 33.14 | 25.43 | 0.70 |
| d 23 | 12.09 | 5.50 | 1.00 |
| d 30 | 2.99 | 2.99 | 2.99 |
| d 35 | 4.79 | 4.79 | 4.79 |

Numerical Example 2

| | f = 72.50014 | fno = 1:2.9 | 2ω = 34.2°~12.4° | | |
|---|---|---|---|---|---|
| r1 = | 356.432 | d1 = | 2.80 | n1 = 1.80100 | v1 = 35.0 |
| r2 = | 105.963 | d2 = | 0.51 | | |
| r3 = | 115.226 | d3 = | 5.09 | n2 = 1.48749 | v2 = 70.2 |
| r4 = | 324.799 | d4 = | 0.15 | | |
| r5 = | 121.032 | d5 = | 7.19 | n3 = 1.48749 | v3 = 70.2 |
| r6 = | −1610.690 | d6 = | 0.15 | | |
| r7 = | 75.548 | d7 = | 7.13 | n4 = 1.48749 | v4 = 70.2 |
| r8 = | 210.911 | d8 = | Variable | | |
| r9 = | 57.175 | d9 = | 3.00 | n5 = 1.78470 | v5 = 26.3 |
| r10 = | 45.651 | d10 = | 1.45 | | |
| r11 = | 51.733 | d11 = | 9.75 | n6 = 1.48749 | v6 = 70.2 |
| r12 = | 1094.956 | d12 = | Variable | | |
| r13 = | 212.158 | d13 = | 1.40 | n7 = 1.83481 | v7 = 42.7 |
| r14 = | 30.453 | d14 = | 7.08 | | |
| r15 = | −79.314 | d15 = | 1.40 | n8 = 1.51633 | v8 = 64.1 |
| r16 = | 35.144 | d16 = | 6.61 | n9 = 1.84666 | v9 = 23.8 |
| r17 = | −4959.330 | d17 = | 3.19 | | |
| r18 = | −46.447 | d18 = | 1.40 | n10 = 1.77250 | v10 = 49.6 |
| r19 = | −281.544 | d19 = | Variable | | |
| r20 = | −696.658 | d20 = | 6.95 | n11 = 1.49700 | v11 = 81.5 |
| r21 = | −30.928 | d21 = | 0.50 | | |
| r22 = | −30.664 | d22 = | 1.45 | n12 = 1.80440 | v12 = 39.6 |
| r23 = | −51.445 | d23 = | 0.15 | | |
| r24 = | 142.742 | d24 = | 3.22 | n13 = 1.83481 | v13 = 42.7 |
| r25 = | −424.715 | d25 = | Variable | | |
| r26 = | ∞ Stop | d26 = | 0.30 | | |
| r27 = | 39.801 | d27 = | 6.00 | n14 = 1.77250 | v14 = 49.6 |
| r28 = | 72.709 | d28 = | 11.28 | | |
| r29 = | 56.870 | d29 = | 2.00 | n15 = 1.78470 | v15 = 26.3 |
| r30 = | 22.764 | d30 = | 0.15 | | |
| r31 = | 23.291 | d31 = | 6.50 | n16 = 1.51633 | v16 = 64.1 |
| r32 = | −138.022 | d32 = | Variable | | |
| r33 = | −687.332 | d33 = | 3.16 | n17 = 1.84666 | v17 = 23.8 |
| r34 = | −51.923 | d34 = | 1.00 | n18 = 1.66755 | v18 = 41.9 |
| r35 = | 52.100 | d35 = | 2.25 | | |
| r36 = | −182.246 | d36 = | 1.50 | n19 = 1.56873 | v19 = 63.2 |
| r37 = | 46.916 | d37 = | Variable | | |
| r38 = | 65.955 | d38 = | 11.50 | n20 = 1.49700 | v20 = 81.5 |
| r39 = | −23.351 | d39 = | 0.15 | | |
| r40 = | −23.857 | d40 = | 2.00 | n21 = 1.87400 | v21 = 35.3 |
| r41 = | −55.118 | d41 = | 3.99 | | |
| r42 = | 66.661 | d42 = | 5.00 | n22 = 1.80518 | v22 = 25.4 |
| r43 = | 217.647 | | | | |

TABLE 2

| VARIABLE SEPARATION | FOCAL LENGTH | | |
|---|---|---|---|
| | 72.50 | 99.50 | 195.00 |
| d 8 | 8.93 | 9.27 | 11.58 |
| d 12 | 0.15 | 10.75 | 23.45 |
| d 19 | 29.97 | 23.17 | 0.15 |
| d 25 | 4.30 | 0.15 | 8.16 |
| d 32 | 3.50 | 3.50 | 3.50 |
| d 37 | 4.81 | 4.81 | 4.81 |

Numerical Example 3

| | f = 72.49989 | fno = 1:2.9 | 2ω = 34.2°~12.4° | | |
|---|---|---|---|---|---|
| r1 = | 208.784 | d1 = | 3.00 | n1 = 1.80518 | v1 = 25.4 |
| r2 = | 99.862 | d2 = | 0.19 | | |
| r3 = | 100.245 | d3 = | 8.93 | n2 = 1.49700 | v2 = 81.5 |
| r4 = | −1100.443 | d4 = | 0.15 | | |
| r5 = | 112.074 | d5 = | 6.54 | n3 = 1.49700 | v3 = 81.5 |
| r6 = | 1249.374 | d6 = | 0.15 | | |
| r7 = | 92.103 | d7 = | 7.22 | n4 = 1.49700 | v4 = 81.5 |
| r8 = | 1027.264 | d8 = | Variable | | |
| r9 = | 593.222 | d9 = | 1.50 | n5 = 1.51633 | v5 = 64.1 |
| r10 = | 152.422 | d10 = | 1.32 | | |
| r11 = | 482.806 | d11 = | 3.25 | n6 = 1.84666 | v6 = 23.8 |
| r12 = | −250.113 | d12 = | 1.50 | n7 = 1.62299 | v7 = 58.2 |
| r13 = | 94.822 | d13 = | Variable | | |
| r14 = | 261.447 | d14 = | 1.40 | n8 = 1.77250 | v8 = 49.6 |
| r15 = | 41.132 | d15 = | 4.57 | | |
| r16 = | −125.838 | d16 = | 1.40 | n9 = 1.48749 | v9 = 70.2 |
| r17 = | 44.165 | d17 = | 4.62 | n10 = 1.84666 | v10 = 23.8 |
| r18 = | 777.630 | d18 = | 2.90 | | |
| r19 = | −52.946 | d19 = | 1.40 | n11 = 1.69895 | v11 = 30.1 |
| r20 = | −227.139 | d20 = | Variable | | |
| r21 = | −8791.826 | d21 = | 2.89 | n12 = 1.77250 | v12 = 49.6 |
| r22 = | −108.787 | d22 = | 0.15 | | |
| r23 = | 76.950 | d23 = | 6.39 | n13 = 1.49700 | v13 = 81.5 |
| r24 = | −55.536 | d24 = | 1.45 | n14 = 1.83400 | v14 = 37.2 |
| r25 = | −362.335 | d25 = | Variable | | |
| r26 = | 56.128 | d26 = | 3.72 | n15 = 1.84666 | v15 = 23.8 |
| r27 = | 243.845 | d27 = | 1.00 | | |
| r28 = | ∞ Stop | d28 = | 9.68 | | |
| r29 = | 54.942 | d29 = | 3.44 | n16 = 1.80400 | v16 = 46.6 |
| r30 = | 334.920 | d30 = | 0.00 | | |
| r31 = | 334.920 | d31 = | 1.08 | n17 = 1.80518 | v17 = 25.4 |
| r32 = | 19.586 | d32 = | 0.00 | | |
| r33 = | 19.586 | d33 = | 6.99 | n18 = 1.60311 | v18 = 60.6 |
| r34 = | −470.040 | d34 = | Variable | | |
| r35 = | 141.442 | d35 = | 1.40 | n19 = 1.83400 | v19 = 37.2 |
| r36 = | 44.284 | d36 = | 2.28 | | |
| r37 = | −116.282 | d37 = | 1.40 | n20 = 1.61772 | v20 = 49.8 |
| r38 = | 24.567 | d38 = | 4.00 | n21 = 1.84666 | v21 = 23.8 |
| r39 = | 41.388 | d39 = | Variable | | |
| r40 = | 103.965 | d40 = | 9.35 | n22 = 1.63930 | v22 = 44.9 |
| r41 = | −24.368 | d41 = | 0.15 | | |
| r42 = | −24.765 | d42 = | 1.20 | n23 = 1.83481 | v23 = 42.7 |
| r43 = | −61.808 | d43 = | 12.91 | | |
| r44 = | 60.361 | d44 = | 5.50 | n24 = 1.77250 | v24 = 49.6 |
| r45 = | 170.890 | | | | |

TABLE 3

| VARIABLE SEPARATION | FOCAL LENGTH | | |
|---|---|---|---|
| | 72.50 | 99.78 | 195.00 |
| d 8 | 0.15 | 11.76 | 21.05 |
| d 13 | 11.60 | 12.71 | 28.25 |
| d 20 | 31.55 | 23.97 | 0.15 |
| d 25 | 6.29 | 1.16 | 0.15 |
| d 34 | 2.58 | 2.58 | 2.58 |
| d 39 | 4.15 | 4.15 | 4.15 |

Numerical Example 4

| | f = 72.52892 | fno = 1:2.9 | 2ω = 34.2°~12.4° | | |
|---|---|---|---|---|---|
| r1 = | 113.707 | d1 = | 2.80 | n1 = 1.76180 | v1 = 27.1 |
| r2 = | 69.528 | d2 = | 0.43 | | |
| r3 = | 69.049 | d3 = | 12.74 | n2 = 1.49700 | v2 = 81.5 |
| r4 = | −308.469 | d4 = | 0.10 | | |

-continued

| | f = 72.52892 | | fno = 1:2.9 | | 2ω = 34.2°~12.4° | |
|---|---|---|---|---|---|---|
| r5 = | 73.095 | d5 = | 7.94 | n3 = | 1.49700 v3 = | 81.5 |
| r6 = | 392.342 | d6 = | Variable | | | |
| r7 = | 979.779 | d7 = | 2.96 | n4 = | 1.80809 v4 = | 22.8 |
| r8 = | −254.050 | d8 = | 1.40 | n5 = | 1.65160 v5 = | 58.5 |
| r9 = | 87.091 | d9 = | Variable | | | |
| r10 = | 153.160 | d10 = | 1.40 | n6 = | 1.72825 v6 = | 28.5 |
| r11 = | 36.920 | d11 = | 4.88 | | | |
| r12 = | −130.193 | d12 = | 1.40 | n7 = | 1.48749 v7 = | 70.2 |
| r13 = | 38.438 | d13 = | 5.24 | n8 = | 1.84666 v8 = | 23.8 |
| r14 = | 960.814 | d14 = | 2.88 | | | |
| r15 = | −52.962 | d15 = | 1.40 | n9 = | 1.72600 v9 = | 53.6 |
| r16 = | −1060.876 | d16 = | Variable | | | |
| r17 = | 6450.021 | d17 = | 2.50 | n10 = | 1.81554 v10 = | 44.4 |
| r18 = | −154.954 | d18 = | 0.15 | | | |
| r19 = | 139.424 | d19 = | 6.11 | n11 = | 1.49700 v11 = | 81.5 |
| r20 = | −46.016 | d20 = | 1.45 | n12 = | 1.80100 v12 = | 35.0 |
| r21 = | −124.015 | d21 = | Variable | | | |
| r22 = | 51.975 | d22 = | 3.56 | n13 = | 1.84666 v13 = | 23.8 |
| r23 = | 138.077 | d23 = | 1.50 | | | |
| r24 = | ∞ | Stop d24 = | 8.60 | | | |
| r25 = | 40.516 | d25 = | 3.14 | n14 = | 1.78800 v14 = | 47.4 |
| r26 = | 74.677 | d26 = | 0.00 | | | |
| r27 = | 74.675 | d27 = | 1.00 | n15 = | 1.80809 v15 = | 22.8 |
| r28 = | 21.524 | d28 = | 0.00 | | | |
| r29 = | 21.394 | d29 = | 7.50 | n16 = | 1.58913 v16 = | 61.1 |
| r30 = | −195.490 | d30 = | Variable | | | |
| r31 = | 386.103 | d31 = | 1.40 | n17 = | 1.80100 v17 = | 35.0 |
| r32 = | 43.907 | d32 = | 2.09 | | | |
| r33 = | −264.153 | d33 = | 1.40 | n18 = | 1.58875 v18 = | 51.2 |
| r34 = | 22.280 | d34 = | 4.00 | n19 = | 1.84666 v19 = | 23.8 |
| r35 = | 32.432 | d35 = | Variable | | | |
| r36 = | 62.047 | d36 = | 11.62 | n20 = | 1.60323 v20 = | 42.3 |
| r37 = | −21.742 | d37 = | 0.18 | | | |
| r38 = | −21.336 | d38 = | 1.20 | n21 = | 1.83481 v21 = | 42.7 |
| r39 = | −88.906 | d39 = | 8.51 | | | |
| r40 = | 71.082 | d40 = | 5.50 | n22 = | 1.72600 v22 = | 53.6 |
| r41 = | −1405.961 | | | | | |

TABLE 4

| FOCAL LENGTH | 72.53 | 99.47 | 194.97 |
|---|---|---|---|
| d 6 | 0.45 | 11.63 | 21.63 |
| d 9 | 11.28 | 12.97 | 26.71 |
| d 16 | 30.85 | 23.88 | 0.15 |
| d 21 | 6.11 | 0.20 | 0.20 |
| d 30 | 2.78 | 2.78 | 2.78 |
| d 35 | 4.15 | 4.15 | 4.15 |

TABLE 5

| | NUMERICAL EXAMPLE | | | |
|---|---|---|---|---|
| EQUATIONS | Example 1 | Example 2 | Example 3 | Example 4 |
| (1) f5A/f5B | −1.738 | −1.902 | −1.790 | −1.583 |
| (2) f5C/f5B | −1.970 | −1.643 | −1.589 | −1.977 |
| (3) f5B/fw | −0.413 | −0.523 | −0.456 | −0.405 |
| (4) Bf/ft | 0.310 | 0.289 | 0.271 | 0.269 |

Thus, the present embodiment may provide a zoom lens system and optical apparatus using the same, where the zoom lens has a large aperture but provides an image stabilizing system that has a small and lightweight image stabilizing lens unit, providing a good optical performance even in stabilizing an image and making compact the entire apparatus.

In addition, the present embodiment may provide a large-aperture zoom lens system where the rear lens component including a relay lens part in the above structure includes a positive lens unit, a negative lens unit (or image stabilizing lens unit), and a positive lens unit, thereby achieving suitable image stabilizing function and a high optical performance by moving the negative lens unit in the relay lens part in the direction perpendicular to the optical axis in correcting an image plane while stabilizing an image.

What is claimed is:

1. A zoom lens system comprising, in order from an object side:
    a front lens component including a plurality of lens units that includes a lens unit movable for zooming and a lens unit movable for focusing; and
    a rear lens component, wherein said rear lens component including, in order from the object side, a lens unit A of positive refractive power, a lens unit B of negative refractive power movable so as to have a component in a direction perpendicular to an optical axis for displacing the image, and a lens unit C of positive refractive power, the image being displaced as the lens unit B moves so as to have the component in the direction perpendicular to an optical axis, wherein conditions −2.5<(f5A)/(f5B)<−1.0, −2.5<(f5C)/(f5B)<−1.0, and −1.0<(f5B)/(fw)<−0.1 are satisfied where (f5A), (f5B), and (f5C) are focal lengths of said lens units A, B and C, respectively, and (fw) is a focal length of an entire lens system at wide-angle end.

2. A zoom lens system according to claim 1, wherein said lens unit B includes one or more positive lenses, and two or more negative lenses.

3. A zoom lens system according to claim 1, wherein a condition (Bf)/(ft)>0.25 is satisfied where (Bf) is a distance from an image plane to a vertex in a lens surface at an image side of a lens closest to the image, and (ft) is a focal length of an entire lens system at a telephoto end.

4. A zoom lens system, comprising:
    a front lens component including, in order from the object side,
    a first lens unit of positive refractive power,
    a second lens unit of positive or negative refractive power,
    a third lens unit of negative refractive power, and
    a fourth lens unit of positive refractive power,
    wherein during zooming from a wide-angle end to a telephoto end, a separation between the first and second lens units keeps constant or increases, a separation between the second and third lens units increases, and a separation between the third and fourth lens units changes; and
    a rear lens component, wherein said rear lens component including, in order from the object side, a lens unit A of positive refractive power, a lens unit B of negative refractive power movable so as to have a component in a direction perpendicular to an optical axis for displacing the image, and a lens unit C of positive refractive power, the image being displaced as the lens unit B moves so as to have the component in the direction perpendicular to an optical axis.

5. A zoom lens system according to claim 4, wherein said second lens unit moves along the optical axis during focusing.

6. A zoom lens system according to claim 4, wherein said first lens unit and rear lens component don't move for zooming.

7. An optical apparatus comprising:
a zoom lens system comprising, in order from an object side, a front lens component including a plurality of lens units that includes a lens unit movable for zooming and a lens unit movable for focusing, and a rear lens component, wherein said rear lens component including, in order from the object side, a lens unit A of positive refractive power, a lens unit B of negative refractive power movable so as to have a component in a direction perpendicular to an optical axis for displacing the image, and a lens unit C of positive refractive power, the image being displaced as the lens unit B moves so as to have the component in the direction perpendicular to an optical axis, wherein conditions $-2.5<(f5A)/(f5B)<-1.0$, $-2.5<(f5C)/(f5B)<-1.0$, and $-1.0<(f5B)/(fw)<-0.1$ are satisfied where (f5A), (f5B), and (f5C) are focal lengths of said lens units A, B and C, respectively, and (fw) is a focal length of an entire lens system at wide-angle end; and
a photoelectric conversion element for receiving an image formed by said zoom lens system.

8. A zoom lens system comprising, in order from an object side:
a front lens component including a plurality of lens units that includes a lens unit movable for zooming and a lens unit movable for focusing,
wherein said front lens further including, a first lens unit of positive refractive power, a second lens unit of positive or negative refractive power, a third lens unit of negative refractive power, and a fourth lens unit of positive refractive power,
wherein during zooming from a wide-angle end to a telephoto end, a separation between the first and second lens units keeps constant or increases, a separation between the second and third lens units increases, and a separation between the third and fourth lens units changes; and
a rear lens component unit, wherein said rear lens component including, in order from the object side, a lens unit A of positive refractive power, a lens unit B of negative refractive power movable so as to have a component in a direction perpendicular to an optical axis for displacing the image, and a lens unit C of positive refractive power, the image being displaced as the lens unit B moves so as to have the component in the direction perpendicular to an optical axis, wherein conditions $-2.5<(f5A)/(f5B)<-1.0$, $-2.5<(f5C)/(f5B)<-1.0$, and $-1.0<(f5B)/(fw)<-0.1$ are satisfied where (f5A), (f5B), and (f5C) are focal lengths of said lens units A, B and C, respectively, and (fw) is a focal length of an entire lens system at wide-angle end.

9. A zoom lens unit system according to claim 8, wherein said second lens unit moves along the optical axis during focusing.

10. A zoom lens system according to claim 8, wherein said first lens unit and rear lens component don't move for zooming.

11. A zoom lens system comprising, in order from an object side;
a front lens component including four lens units, each separation among said four lens units being variable during zooming; and
a rear lens component including, in order from the object side, a lens unit A of positive refractive power, a lens unit B of negative refractive power movable so as to have a component in a direction perpendicular to an optical axis for displacing, the image, and a lens unit C of positive refractive power,
wherein none of the lens units A, B and C move along the optical axis for zooming.

* * * * *

UNITED STATES PATENT AND TRADEMARK OFFICE
CERTIFICATE OF CORRECTION

PATENT NO.    : 6,646,804 B2
DATED         : November 11, 2003
INVENTOR(S)   : Akira Harada It is certified that error appears in the above-identified patent and that said Letters Patent is hereby corrected as shown below:

Column 2,
Line 7, delete "power. reduces" and insert therefor -- power, reduces --
Line 9, delete "unit. and" and insert therefor -- unit, and --

Column 7,
Line 56, delete "FIG. 24" and insert therefor -- FIG. 25 --

Signed and Sealed this

Fifth Day of July, 2005

JON W. DUDAS
*Director of the United States Patent and Trademark Office*